(12) United States Patent
Chang et al.

(10) Patent No.: US 8,366,013 B2
(45) Date of Patent: Feb. 5, 2013

(54) TEMPERATURE CONTROLLING VALVE

(75) Inventors: Yuanhao Chang, Taichung (TW); Tsungyi Lo, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 595 days.

(21) Appl. No.: 12/716,047

(22) Filed: Mar. 2, 2010

(65) Prior Publication Data
US 2011/0215163 A1  Sep. 8, 2011

(51) Int. Cl.
*G05D 23/13* (2006.01)

(52) U.S. Cl. .................. 236/12.2; 236/12.21; 236/12.23

(58) Field of Classification Search .................. 236/12.1, 236/12.11, 12.2, 12.21, 12.22, 12.23
See application file for complete search history.

(56) References Cited

U.S. PATENT DOCUMENTS 8,056,823 B2 * 11/2011 Xie ............................. 236/12.11
2006/0243813 A1 * 11/2006 Beck .......................... 236/12.11

* cited by examiner

*Primary Examiner* — Marc Norman

(57) ABSTRACT

A temperature controlling valve serves to adjust a mixed rate of cold and hot waters to control a temperature of the mixed cold and hot water by using a water supplying means having a first pore to flow the cold water, a second pore to flow the hot water, a first shield to close the first pore, and a second shield to close the second pore; wherein when the temperature control set is driven by a driving motor to rotate at an original position, the first and the second shields are actuated to close the first and the second pores so that the cold and the hot waters flow into a valve core to be mixed together, wherein an inverse relationship exists between the cross sectional area of the first pore to flow the hot water and the cross sectional area of the second pore to flow the cold water.

16 Claims, 24 Drawing Sheets

TEMPERATURE CONTROLLING VALVE

BACKGROUND OF THE INVENTION

1. Field of the Invention

The present invention relates to a temperature controlling valve that is adapted for a digital showering system to control a temperature of mixed hot and cold water, obtaining a desired showering temperature.

2. Description of the Prior Art

Conventional temperature controlling valve is controlled in a disc rotating manner, and includes two elongated holes to flow cold and hot waters respectively, and when one disc rotates relative to another disc, an inverse relationship exists between the cross sectional area of a first pore to flow hot water and the cross sectional area of a second pore to flow cold water so as to become increased or decreased relatively, controlling cold-water and hot-water flowing amount to obtain a desired temperature. The discs are driven by a driving motor, wherein they are forced equally to engage with each other tightly, thereby preventing water from leak. However, such an operation will cause a large friction resistance. To overcome the friction resistance, a driving motor with high torque output is adapted for the temperature controlling valve at high cost and in a large size.

Furthermore, the conventional temperature controlling valve can not be used to control temperature precisely, because the rotating travel of the disc is limited.

The present invention has arisen to mitigate and/or obviate the afore-described disadvantages.

SUMMARY OF THE INVENTION

The primary object of the present invention is to provide a temperature controlling valve that is capable of overcoming the shortcomings of the conventional temperature controlling valve.

Another object of the present invention is to provide a temperature controlling valve adapted for a digital showering system to control a temperature of mixed hot and cold water, obtaining a desired showering temperature.

A temperature controlling valve in accordance with the present invention comprises:

a base including a first end wall, a second end wall, and a peripheral wall; among the first end wall, the second end wall, and the peripheral wall being defined a receiving groove, the peripheral wall passing through a first tunnel to flow hot water and a second tunnel to flow cold water at two different axial positions respectively and to communicate with the receiving groove, the peripheral wall including a first passage arranged on one side thereof proximate to the second end wall so as to communicate with the receiving groove;

a temperature control set installed in the receiving groove of the base, and between the temperature control set and the receiving groove being defined a first external chamber to receive the hot water and to communicate with the first tunnel, and a second external chamber to receive the cold water and to communicate with the second tunnel; the temperature control set including a first internal chamber to receive the hot water and a second internal chamber to receive the cold water, both of which are in communication with the first passage; the temperature control set further including a casing, and a valve core movably contacting with the casing to be driven to rotate at an original position;

a water supplying means used in the casing and the valve core of the temperature control seat, and including a first pore to flow the hot water and to communicate with the first external chamber and the first internal chamber, including a second pore to flow the cold water and to communicate with the second external chamber and the second internal chamber, including a first shield to close the first pore, and including a second shield to close the second pore; a part of the first pore where is not closed by the first shield being defined a cross sectional area to flow the hot water, and a part of the second pore where is not closed by the second shield being defined a cross sectional area to flow the hot water; a cross sectional area of the first pore to flow the cold water and the cross sectional area of the second pore to flow the hot water are relatively increased or decreased with the rotation of the valve core in the casing.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
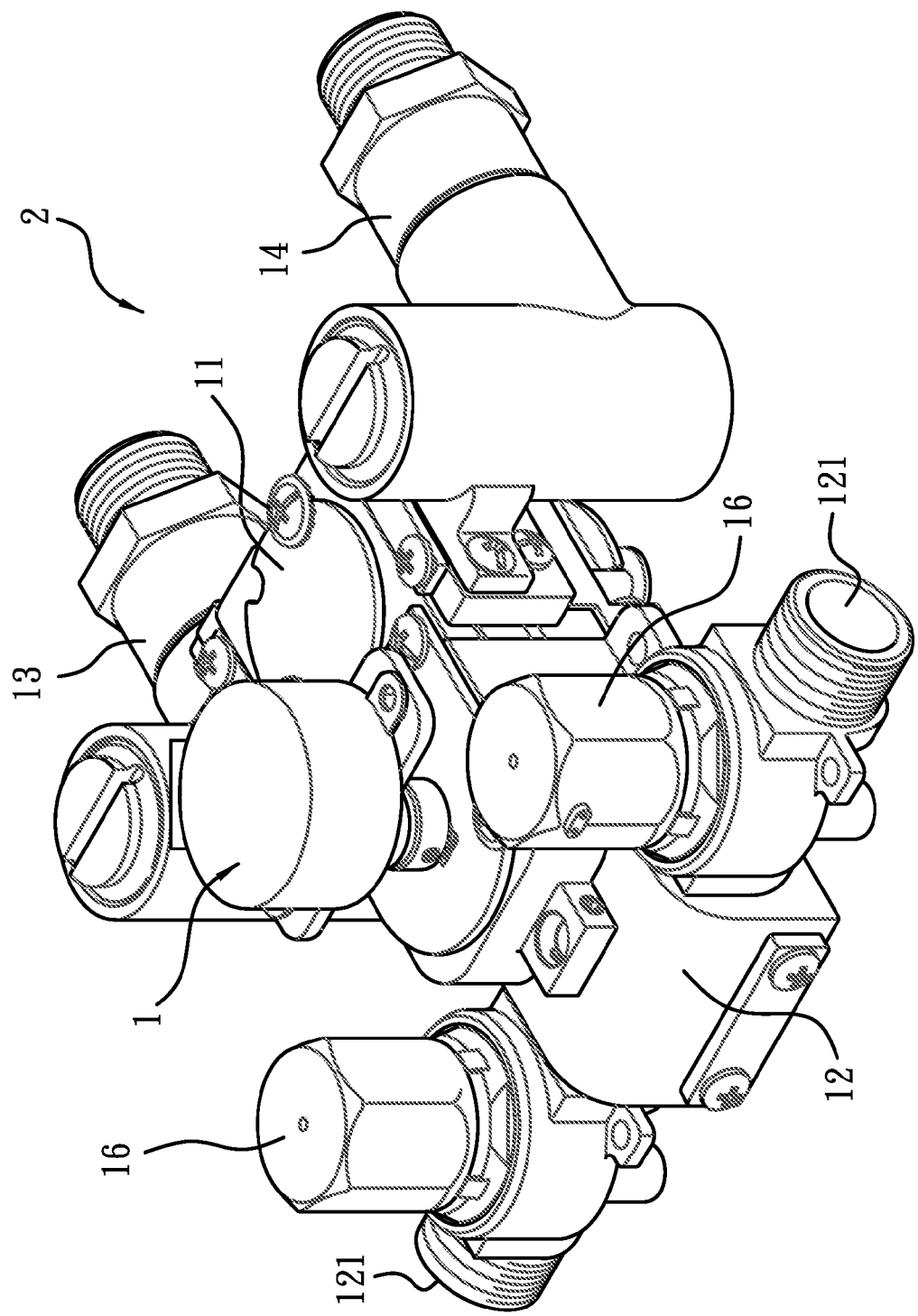
FIG. 1 is a perspective view showing a temperature controlling valve being installed to an outlet valve seat according to a first embodiment of the present invention.
Figure 2:
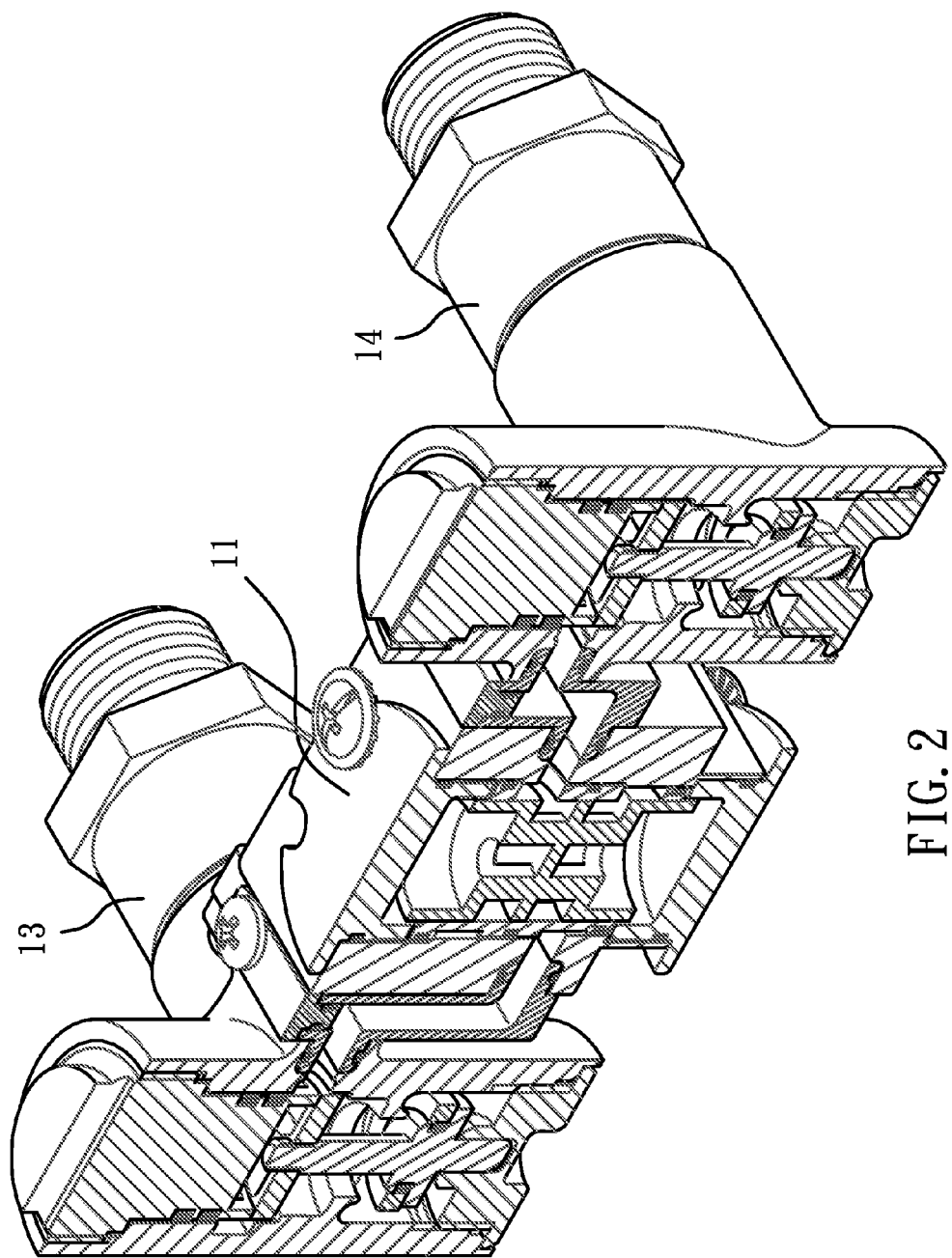
FIG. 2 is a perspective view showing the cross section of the outlet valve seat of FIG. 1.
Figure 3:
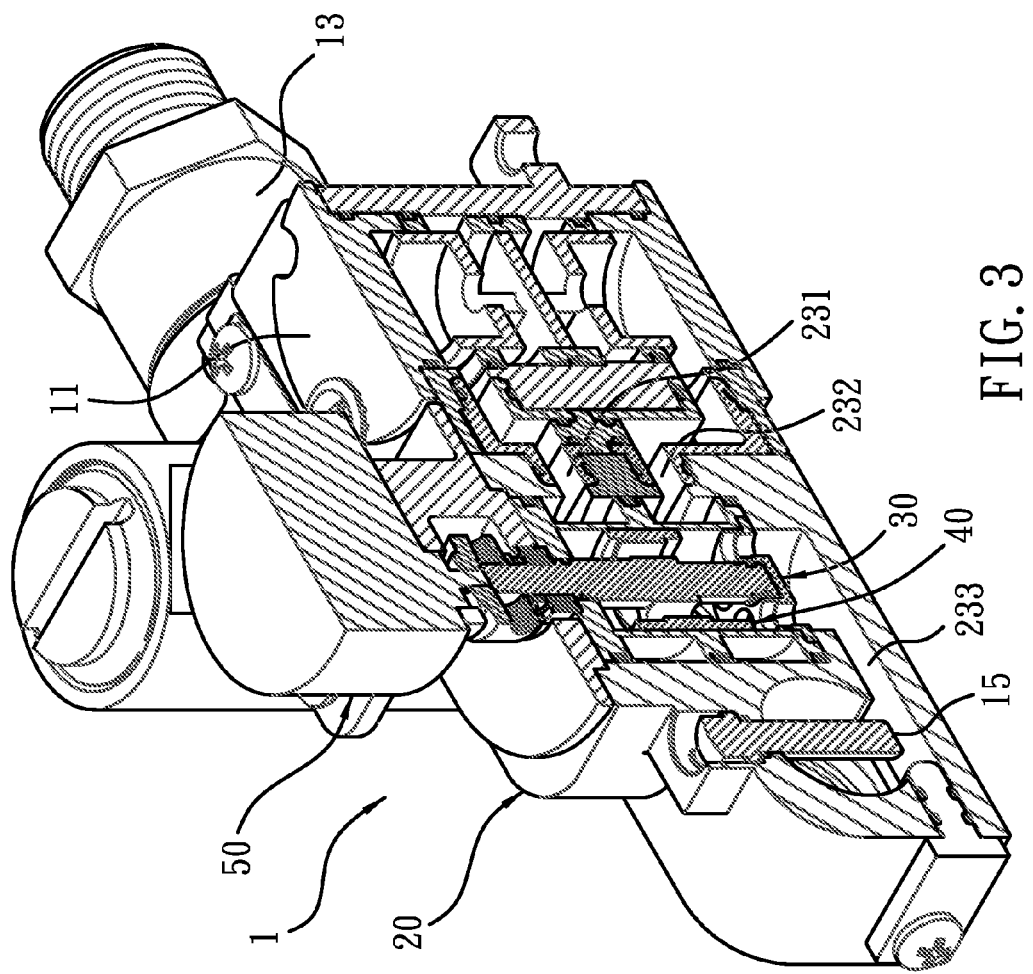
FIG. 3 is another perspective view showing the cross section of the outlet valve seat of FIG. 1.

Referring to FIGS. 1-3, a temperature controlling valve 1 according to a first embodiment of the present invention is used in a digital showering system and installed to an outlet valve seat 2, the outlet valve seat 2 includes a pressure balance valve 11 installed to an inlet end of the temperature controlling valve 1; an outlet piping 12 to receive mixed cold and hot water installed to an outlet end of the temperature controlling valve 1; a first inlet piping 13 to receive cold water from a cold-water flowing piping and a second inlet piping 14 to receive hot water from a hot-water flowing piping, both of which are installed to an inlet end of the pressure balance valve 11; a temperature sensor 15 installed in the outlet piping 12 to sense temperature of the mixed cold and hot water so as to facilitate operation of the temperature valve 1; two solenoid valves 16 installed to two different outflow channels of the outlet piping 12 so as to control opening and closing of the outflow channels respectively. After the cold and the hot waters flow into the pressure balance valve 11 through the first and the second inlet pipings 13, 14, the cold and the hot waters are adjusted automatically to have a temperature balance therebetween and then flow into the temperature controlling valve 1 at a proper rate to be mixed together, the mixed cold and hot water further flows to the outlet piping 12 to be controlled by the solenoid valves 16 so that the mixed cold and hot water is supplied from an outlet 121.

The temperature controlling valve 1 can adjust inflow amount and mixed rate of the cold and the hot waters automatically based on a temperature sensed by the temperature sensors 15 to control a temperature of the mixed cold and hot water. The outlet valve seat 2 is well-known, therefore further remarks are omitted.

The temperature controlling valve 1 includes a housing 20, a temperature control set 30, a water supplying means 40, and a driving motor 50.

Figure 4:
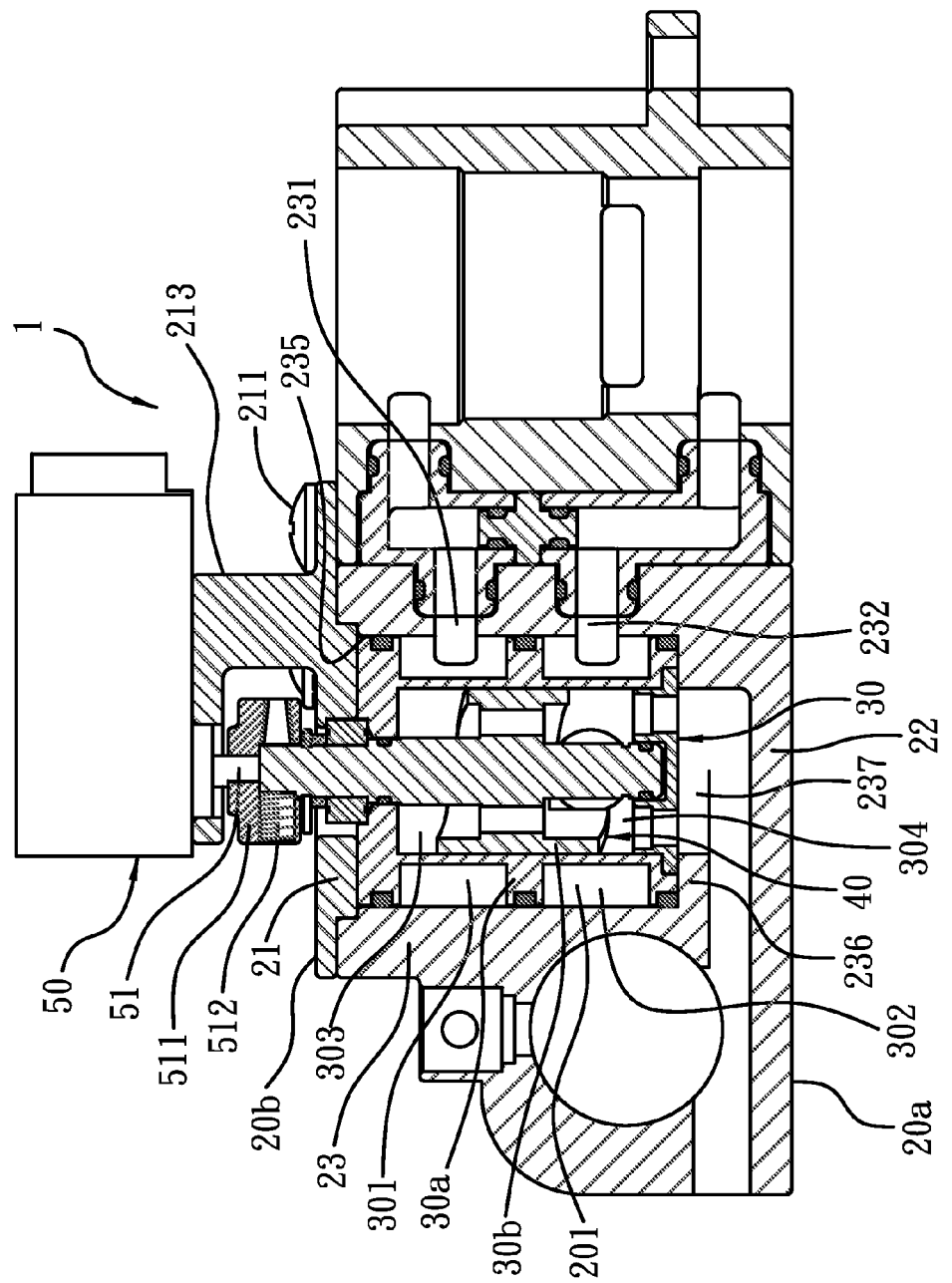
FIG. 4 is a cross sectional view showing the assembly of the temperature controlling valve according to the first embodiment of the present invention.
Figure 5:
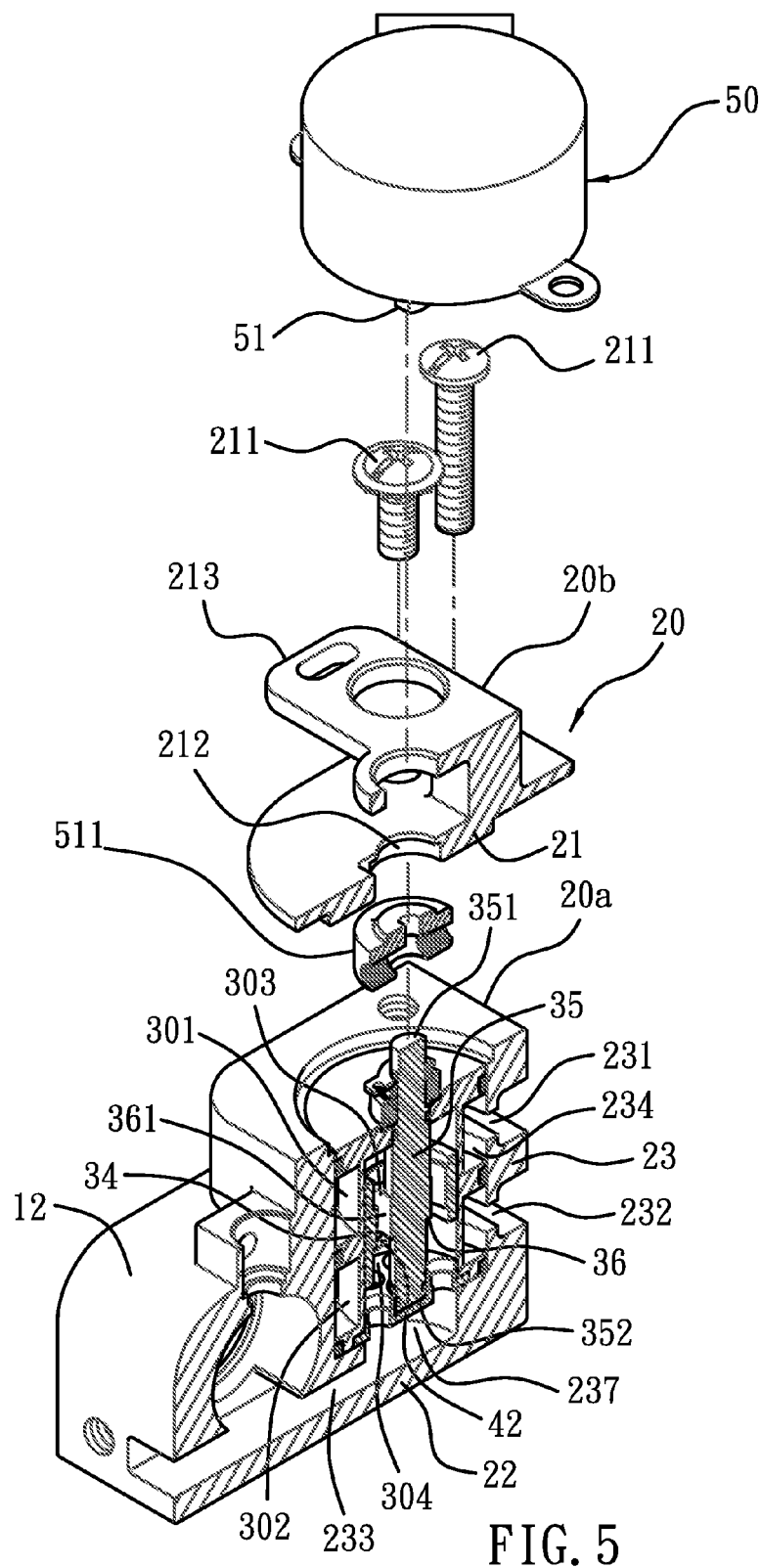
FIG. 5 is a perspective view showing the exploded components of a part of the temperature controlling valve of the first embodiment of the present invention.

The base 20 as shown in FIGS. 4 and 5, includes a first end wall 21 disposed on a top end thereof, a second end wall 22 mounted on a bottom end thereof, and a peripheral wall 23 fixed between the first and the second end walls 21, 22; among the first end wall 21, the second end wall 22, and the peripheral wall 23 is defined a receiving groove 201; the peripheral wall 23 extends at two different axial positions, e.g., at a higher axial position and a lower axial position, to pass through a first tunnel 231 for flowing hot water and through a second tunnel 232 for flowing cold water 232 which are in communication with the receiving groove 201 and the pressure balance valve 11 so as to flow the hot and the cold waters from the pressure balance valve 11 into the receiving groove 201 individually; the peripheral wall 23 includes a first passage 233 arranged on one side thereof proximate to the second end wall 22 so as to communicate with the receiving groove 201 and the outlet piping 12 such that the cold and the hot waters mix in the receiving groove 201 and further flow to the outlet piping 12.

The base 20 further includes a body 20a and an upper housing 20b, the body 20a includes the peripheral wall 23 and the second end wall 22 formed therein, and peripheral wall 20a includes a cylinder fence 234 formed thereon and an opening 235 attached on a top end thereof, the second end wall 22 includes a positioning fence 236 disposed therein to define a first hole 237 to communicate with the first passage 233.

The peripheral wall 23, the second end wall 22, and the outlet piping 12 are integrally formed.

The upper housing 20b is positioned in the opening 235 of the upper housing 20b to form the first end wall 21 and is retained with a top end of the peripheral wall 23 and a top end of the pressure balance valve 11 by using a plurality of screw bolts 211 so that the opening 235 is closed properly, and the receiving groove 201 is defined between the opening 235 and the body 20a.

The upper housing 20b includes a second hole 212 mounted on a central portion thereof, and includes a motor holder 213 extending from one side thereof adjacent to the pressure balance valve 11.

Figure 6:
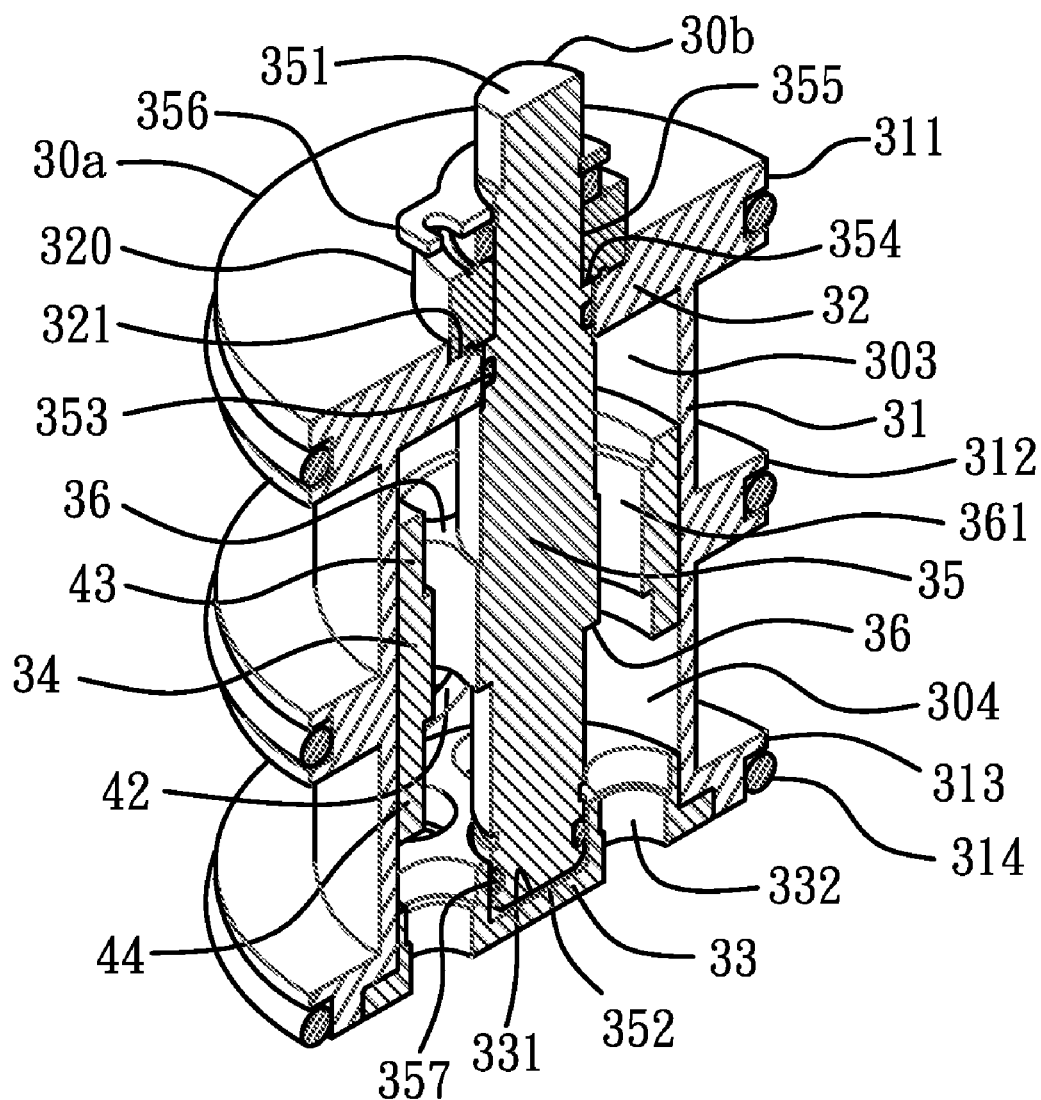
FIG. 6 is a perspective view showing the cross section of the assembly of a temperature control set of the temperature controlling valve according to the first embodiment of the present invention.
Figure 7:
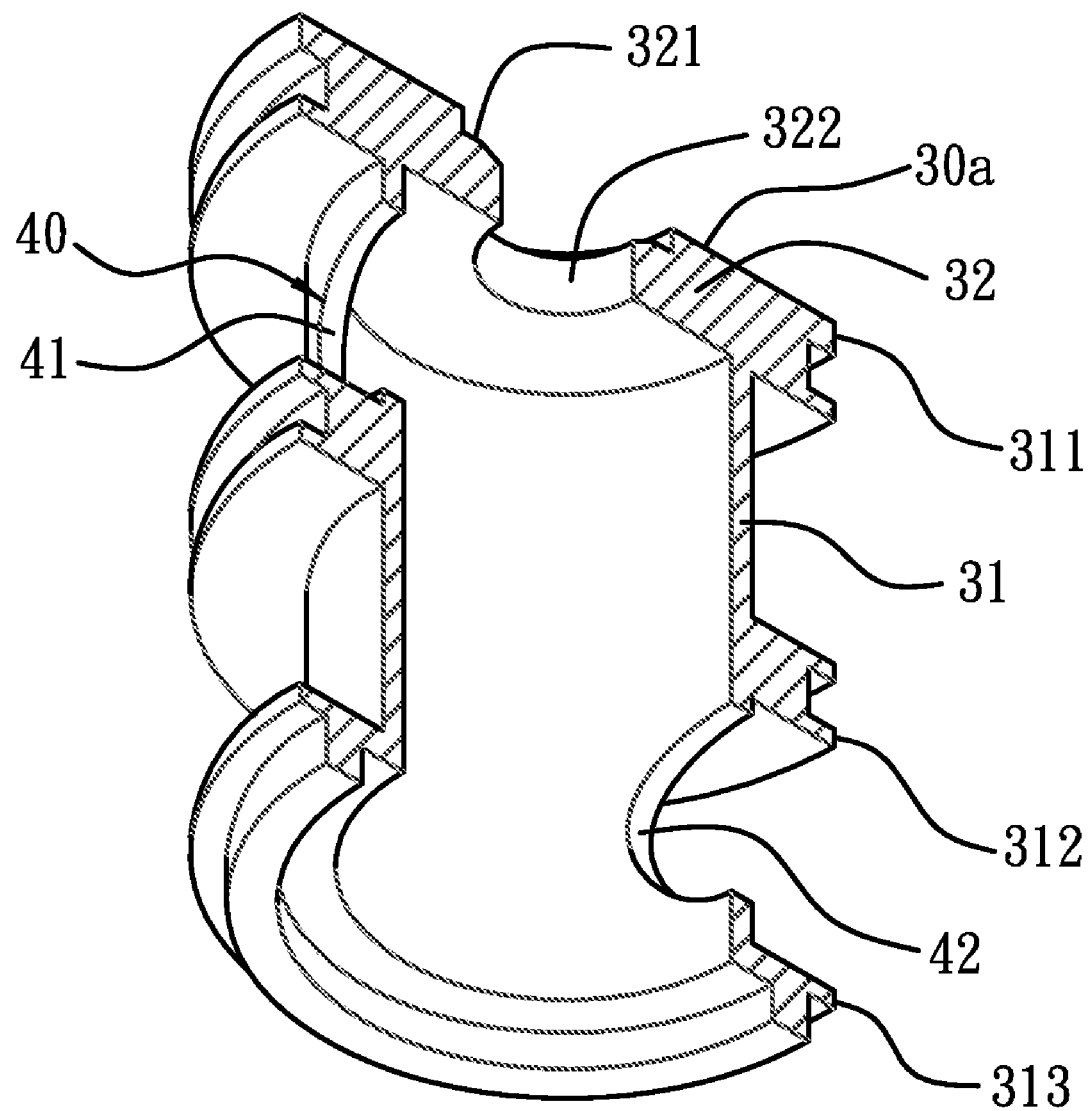
FIG. 7 is a perspective view showing the cross section of the assembly of a casing of the temperature controlling valve according to the first embodiment of the present invention.
Figure 8:
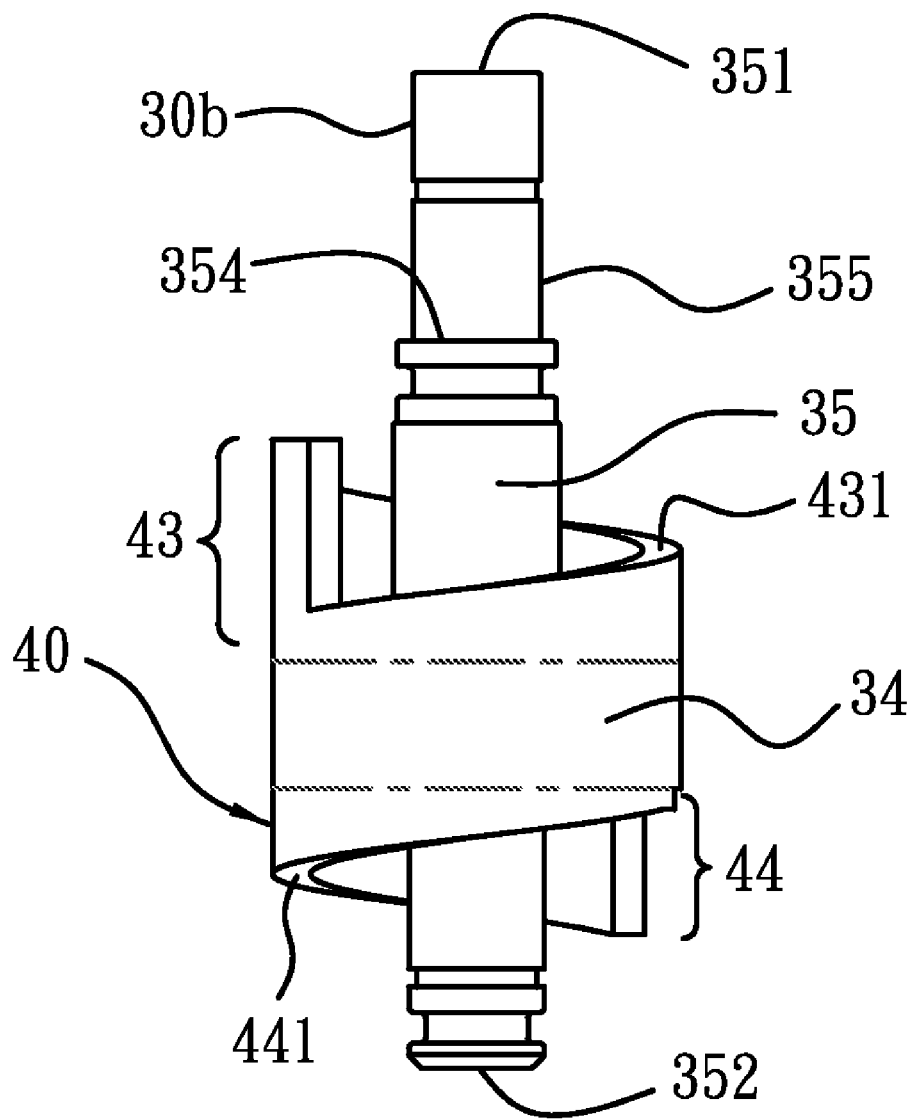
FIG. 8 is a plan view showing a valve core of the temperature controlling valve according to the first embodiment of the present invention.

The temperature control set 30 as illustrated in FIGS. 6-8, are installed in the receiving groove 201 of the base 20, and between the temperature control set 30 and the receiving groove 201 are defined a first external chamber 301 to receive hot water and to communicate with the first tunnel 231, a second external chamber 302 to receive cold water and to communicate with the second tunnel 232; the temperature control set 30 includes a first internal chamber 303 to receive hot water and a second internal chamber 304 to receive cold water, both of which are in communication with the first passage 233; the temperature control set 30 further includes a casing 30a, a slidable sleeve attached in the casing 30a, and a valve core 30b driven to rotate at an original position.

The casing 30a includes a cylinder first peripheral rim 31, a first end rim 32 integrally connected onto a top end of the first peripheral rim 31, and a second end rim 33 arranged on a bottom end of the first peripheral rim 31; the first peripheral rim 31 includes a first projected wall 311, a second projected wall 312, and a third projected wall 313 radially extending from a top portion, a middle portion, and a bottom portion thereof respectively, and the first, the second, and the third projected walls 311, 312, 313 individually includes a first seal ring 314 retained thereon to engage with the receiving groove 201 of the base 20 so that between the first peripheral rim 31 of the casing 30a and the inner fence 234 of the receiving groove 201 of the base 20 are spaced apart to form the first external chamber 301 by using the first seal rings 314 of the first, the second, and the third projected walls 311, 312, and 313.

The first end rim 32 includes a positioning slot 321 disposed on a central portion thereof to receive a bearing 320, and a top edge of the bearing 320 is biased against by the second hole 212, the positioning slot 321 includes an aperture 322 mounted on a central portion thereof.

The second end rim 33 includes a closed fixing segment 331, and the fixing segment 331 includes a number of downward decreased first bores 332 fixed therearound to communicate with the second internal chamber 304 so as to further communicate with the first passage 233 via the first hole 237.

The valve core 30b includes a cylinder second peripheral rim 34, a centrally axial segment 35 extending along the second peripheral rim 34, and an isolating rim 36 integrally connecting with the second peripheral rim 34 and the centrally axial segment 35.

The second peripheral rim 34 and the first peripheral rim 31 contact with each other as they rotate.

The centrally axial segment 35 of the valve core 30b includes a first end portion 351 and a second end portion 352; the first end portion 351 extends out of the second hole 212 of the upper housing 20b through the aperture 322 of the casing 30a, the bearing 320, and the second hole 212 of the upper housing 20b, wherein the centrally axial segment 35 includes a second seal ring 353 disposed on an upper side thereof to engage with the aperture 322, and the second seal ring 353 includes a stepped rim 354 formed on an upper side thereof to limit the bearing 320, the stepped rim 354 includes a pivotal portion 355 fixed on an upper side thereof to be fitted to the bearing 320, and the pivotal portion 355 includes a C-shaped retainer 356 fitted to an upper side thereof to engage with the bearing 320, such that a top end of the centrally axial segment 35 of the valve core 30b rotates with the casing 30a. The centrally axial segment 35 includes a third seal ring 357 retained thereon adjacent to the second end portion 352 to engage with the fixing segment 331 of the second end rim 33 of the casing 30a so as to actuate the valve core 30b to rotate smoothly.

The isolating rim 36 of the valve core 30b is used to separate the first internal chamber 303 from the second internal chamber 304, and includes a plurality of second bores 361 arranged thereon to communicate the first internal chamber 303 with the second internal chamber 304.

The first internal chamber 303 includes the centrally axial segment 35, the second peripheral rim 34, the first peripheral rim 31, and the first end rim 32 defined therein. The second internal chamber 304 includes the centrally axial segment 35, the second peripheral rim 34, the first peripheral rim 31, and the second end rim 33 defined therein.

The water supplying means 40 is used in the casing 30a and the valve core 30b of the temperature control seat 30, and includes a first pore 41 to flow hot water and to communicate with the first external chamber 301 and the first internal chamber 303, includes a second pore 42 to flow cold water and to communicate with the second external chamber 302 and the second internal chamber 304, includes a first shield 43 to close the first pore 41, and includes a second shield 44 to close the second pore 42; a part of the first pore 41 where is not closed by the first shield 43 is defined a cross sectional area to flow the hot water, and a part of the second pore 42 where is not closed by the second shield 44 is defined a cross sectional area to flow the hot water; a cross sectional area of the first pore 41 to flow the cold water and the cross sectional area of the second pore 41 to flow the hot water are relatively increased or decreased with the rotation of the valve core 30b in the casing 30a.

The first and the second pores 41, 42 are disposed at a higher and a lower axial positions of the first peripheral rim 31 of the casing 30a, and arranged at two symmetrical positions of the first peripheral rim 31 spaced 180 degree apart from each other. The first pore 41 is fixed on the first peripheral rim 31 so that the first external chamber 301 communicates with the first internal chamber 303. The second pore 42 is secured on the first peripheral rim 31 so as to communicate the second external chamber 302 with the second internal chamber 304.

The first and the second shields 43, 44 are arranged to a top and a bottom sides of the second peripheral rim 34 of the valve core 30b respectively.

The first shield 43 extends from a top end of the second peripheral rim 34 as shown as a first imaginary line in FIG. 8, and an upper zone of a first imaginary line is the first shield 43 with a spiral top edge 431 so that an axial height of the first shield 43 changes around a circumferential direction. If the first shield 43 is expanded onto a plane as shown in FIG. 9, a first axial height h1 is formed on a certain circumferential position, and when displacing rightward around a predetermined circumferential direction from the first axial height h1, the axial height h1 becomes increased until a stepped portion where a second axial height h2 and a third axial height h3 are formed, and the third axial height h3 displaces a certain circumferential distance with the same circumferential direction until the third axial height h3 connects with the first axial height h1, thereby forming a 360 degree of annular rim.

Figure 9:
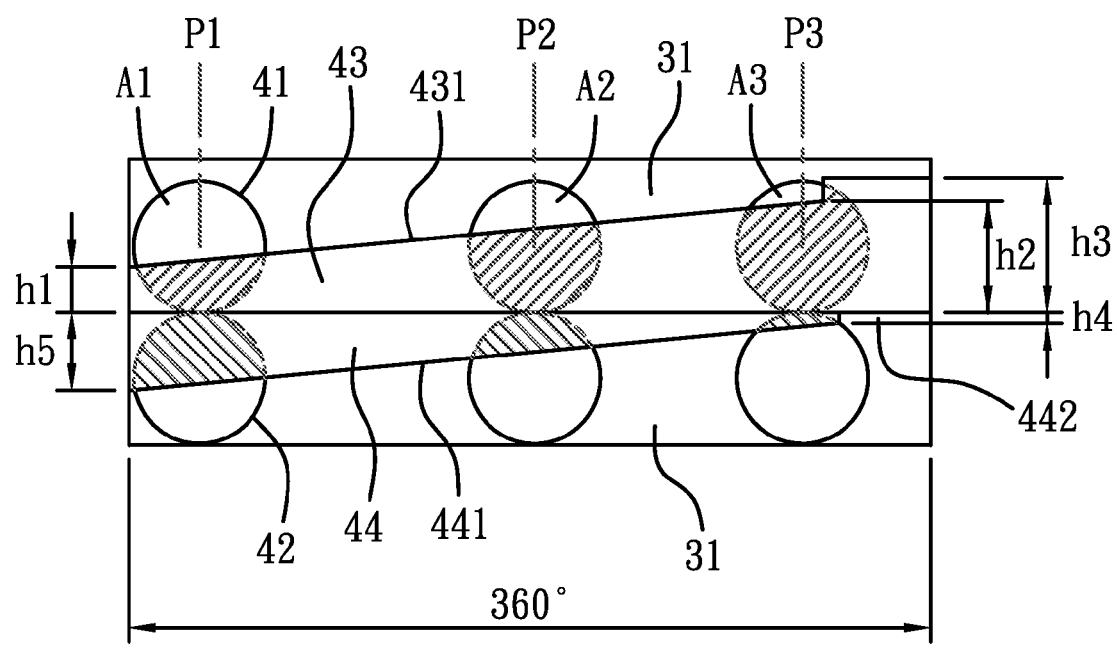
FIG. 9 is a cross sectional view of a temperature control set of the temperature controlling valve according to the first embodiment of the present invention.

The first shield 43 serves to close the first pore 41 as shown in FIG. 9, and a bottom side of the first pore 41 and a bottom side of the first shield 43 are located at the same axial height so that when a center of the first pore 41 is located at a first circumferential position P1, the cross sectional area of the first pore 41 closed by the first shield 43 becomes smallest, and a first cross sectional area A1 of the first pore 41 to flow the hot water becomes largest, such that the hot water from the first external chamber 301 flows into the first internal chamber 303 at the largest amount to enhance a mixed rate of the hot water. When the center of the first pore 41 is located at a second and a third circumferential positions P2 and P2, a second and a third cross sectional areas A2, A3 to flow hot water become decreased or the second and the third cross sectional areas A2, A3 are shielded completely without flowing water. In this embodiment, the first pore 41 changes along the circumferential direction by rotating the valve core 30b so that a top end of the second peripheral rim 34 integrally couples with the first shield 43 to rotate in relation to the first pore 41.

The second shield 44 extends along a bottom end of the second peripheral rim 34 as illustrated in FIG. 7, and on a connection of the second peripheral rim 34 and the second shield 44 is formed a second imaginary line, wherein a lower zone of the second imaginary line is the second shield 44 with a spiral bottom edge 441 so that an axial height of the first shield 44 changes around the circumferential direction. If the second shield 44 is expanded onto a plane as illustrated in FIG. 9, a fourth axial height h4 is formed on a certain circumferential position, and when displacing leftward around a predetermined circumferential direction from the fourth axial height h4, the axial height h4 becomes increased until a fifth axial height h5 becomes largest to obtain a border of the second shield 44, and the second shield 44 includes a cutout 442 extending around a circumferential side thereof, two sides of the cutout 442 communicate with two borders of the second shield 44.

The second shield 44 is used to close the second pore 42 properly, and a closing structure and operation are the same as these of the first shield 43, thus further remarks are omitted. It is to be noted that when the valve core 30b rotates with the first and the second shields 43, 44 in the circumferential direction, the cross sectional area of the first pore 41 to flow hot water becomes decreased, and the cross sectional area of the second pore 42 to flow cold water becomes increased, e.g., an inverse relationship exists between the cross sectional area of the first pore 41 to flow the hot water and the cross sectional area of the second pore 42 to flow the cold water, and when the valve core 30b rotates toward another circumferential direction, the cross sectional area of the first pore 41 to flow the hot water becomes increased, and the cross sectional area of the second pore 42 to flow the cold water becomes decreased, but the inverse relationship between the cross sectional area of the first pore 41 to flow the hot water and the cross sectional area of the second pore 42 to flow the cold water remains unchanged.

Furthermore, when an axial height of the second shield 44 is at the highest position, the second pore 42 is not closed completely to supply cold water, but when an axial height of the first shield 43 is at the highest position, the second pore 42 is closed completely that can not supply hot water any more to comply with actual demand, wherein the second pore 42 is located at the cutout 442 of the second shield 44 to flow cold water at the largest amount.

The driving motor 50 as illustrated in FIGS. 1, 4, and 5 is installed to the motor holder 213 of the upper housing 20b, an output shaft 51 is connected to the valve core 30b by ways of a coupling member 511 and two retaining elements 512 from the first end portion 351 of the centrally axial segment 35 of the upper housing 20b to actuate the valve core 30b to rotate.

The second peripheral rim 34 of the valve core 30b contacts with the first peripheral rim 31 of the casing 30a and rotates relative to the first peripheral rim 31 of the casing 30a, and the first peripheral rim 31 integrally extends to form the first and the second shields 43, 44, the first and the second shields 43, 44 contact with the first peripheral rim 31 of the casing 30a and rotate to achieve a closing effect.

An anti-torque value generating from the friction between the first shield 43, the second shield 44, the valve core 30b, and the casing 30a is less than 0.1N-M, therefore the driving motor 50 with a lower torque output can cooperate with the power requirement of the present invention to lower cost and size of the driving motor.

Thereby, the temperature controlling valve of the present invention can control the temperature of the mixed cold and hot water precisely, and the size of the driving motor 50 is lowered to decrease the size of the outlet valve seat 2 as well.

With reference to FIGS. 3, 4, and 6, the hot and the cold waters flow into the first external chamber 301 and the second external chamber 302 respectively from the first tunnel 231 and the second tunnel 232 through the first pore 41 and the second pore 42, and further flow into the first internal chamber 303 and the second internal chamber 304, wherein the hot water in the first internal chamber 303 flows into the second internal chamber 304 from the second bores 361 of the isolating rim 36 to mix with the cold water, and then the mixed cold and hot water flows downward to the first passage 233 from the first bores 332 of the second end rim 33, finishing hot and cold water mixing process. Thereby, the driving motor 50 actuates the valve core 30b to rotate based on the temperature sensed by the temperature sensor 15 to adjust mixing rate of the cold and the hot waters freely. Because the valve core 30b is rotated to a predetermined direction, the cross sectional area of the first pore 41 to flow the hot water and the cross sectional area of the second pore 41 to flow the cold water are adjusted to control the mixed rate of the cold and the hot waters. Besides, the cold water is used as the mixed water completely according to actual demand.

Figure 10:
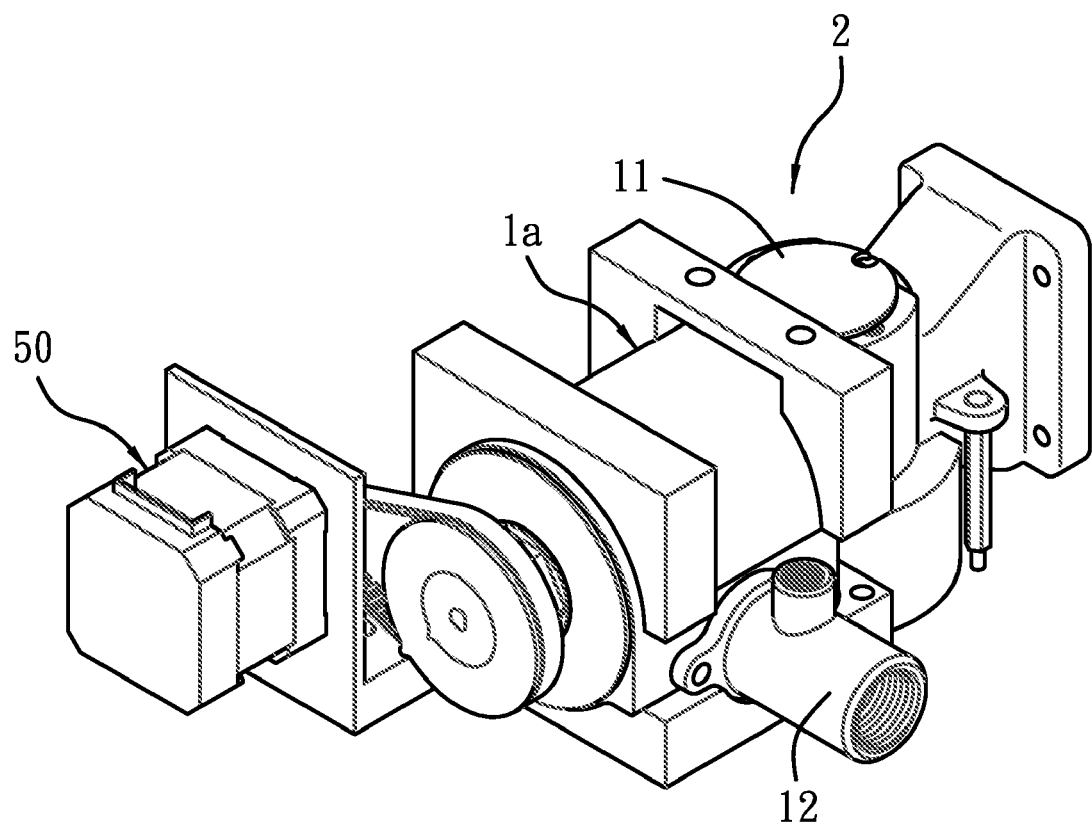
FIG. 10 is a perspective view showing a temperature controlling valve being installed to another outlet valve seat according to a second embodiment of the present invention.
Figure 11:
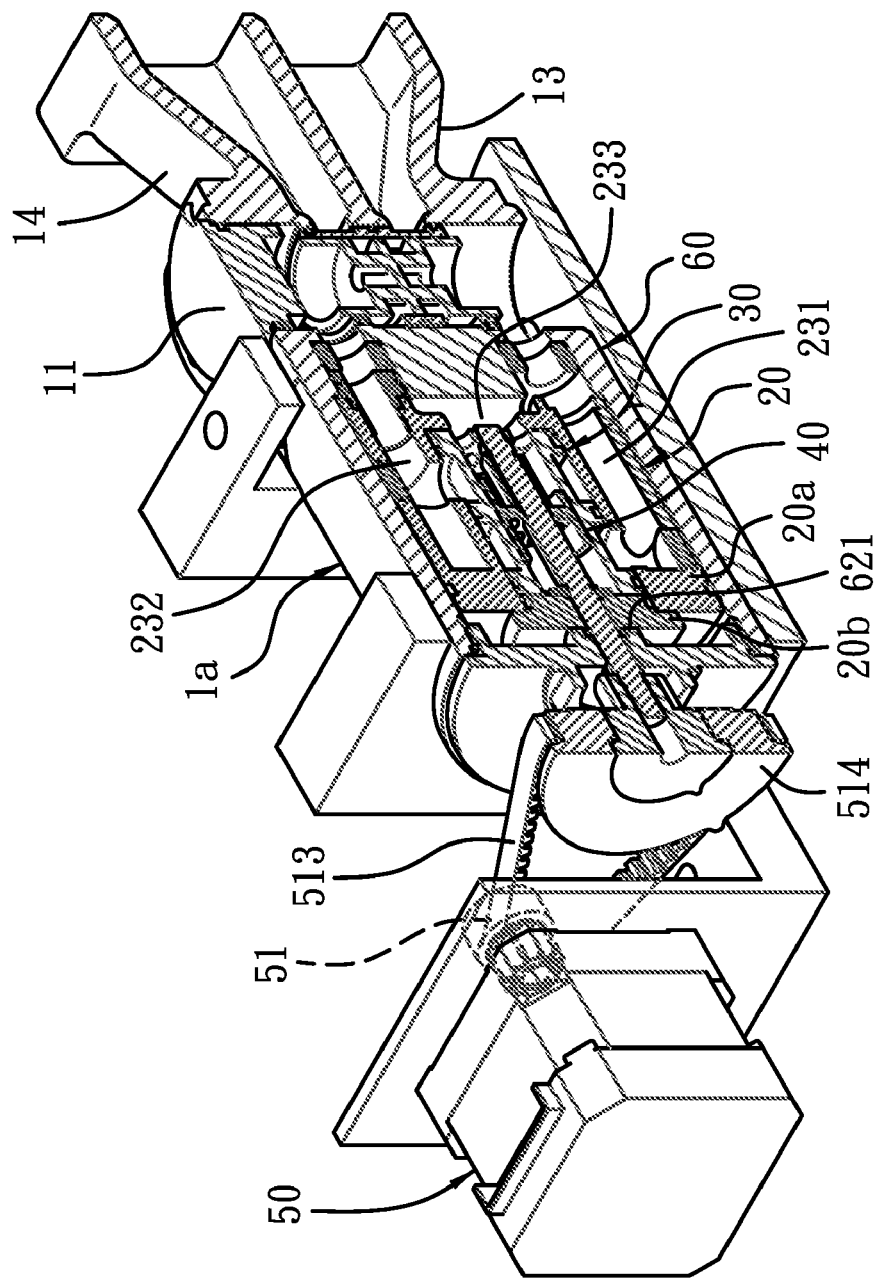
FIG. 11 is a perspective view showing a cross section of an outlet valve seat of FIG. 10.
Figure 12:
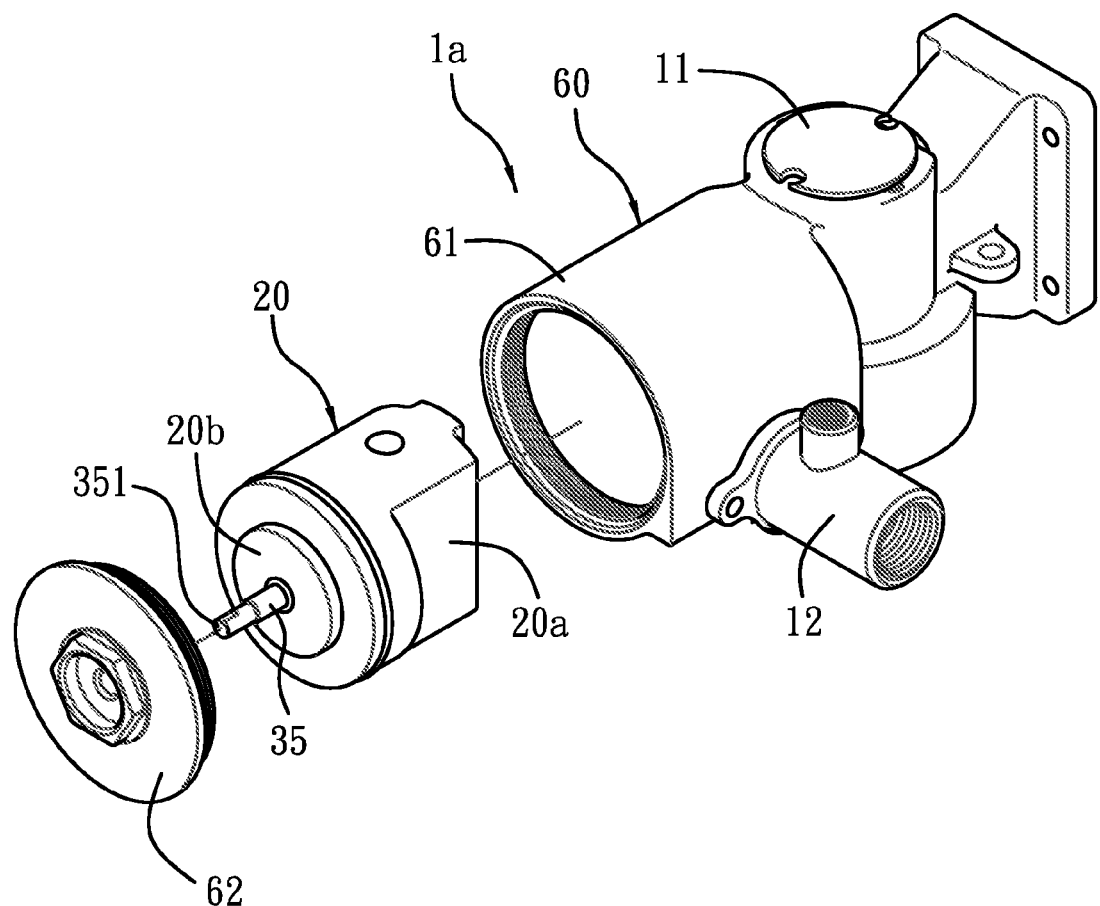
FIG. 12 is a perspective view showing the assembly of a part of the outlet valve seat of FIG. 10.
Figure 13:
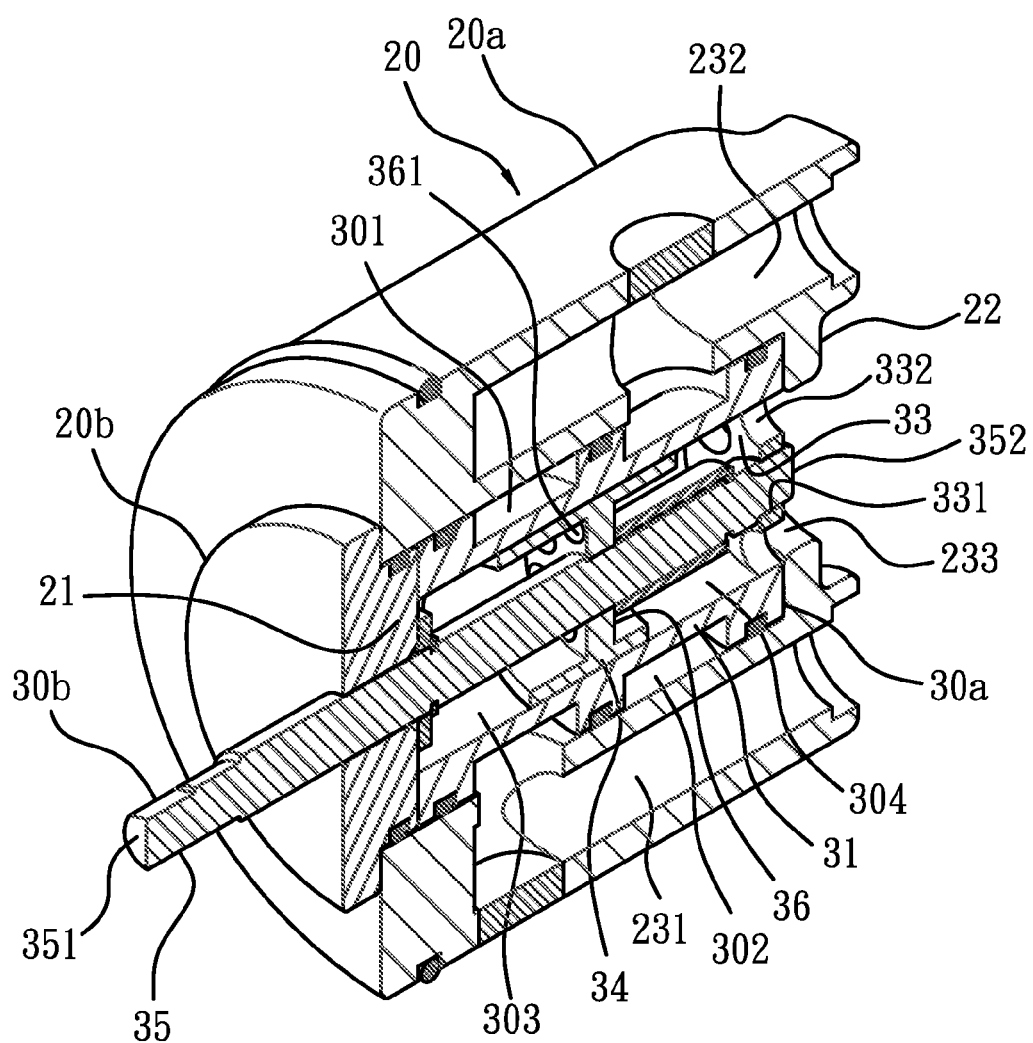
FIG. 13 is a perspective view showing the cross section of a part of the temperature controlling valve according to a second embodiment of the present invention.
Figure 14:
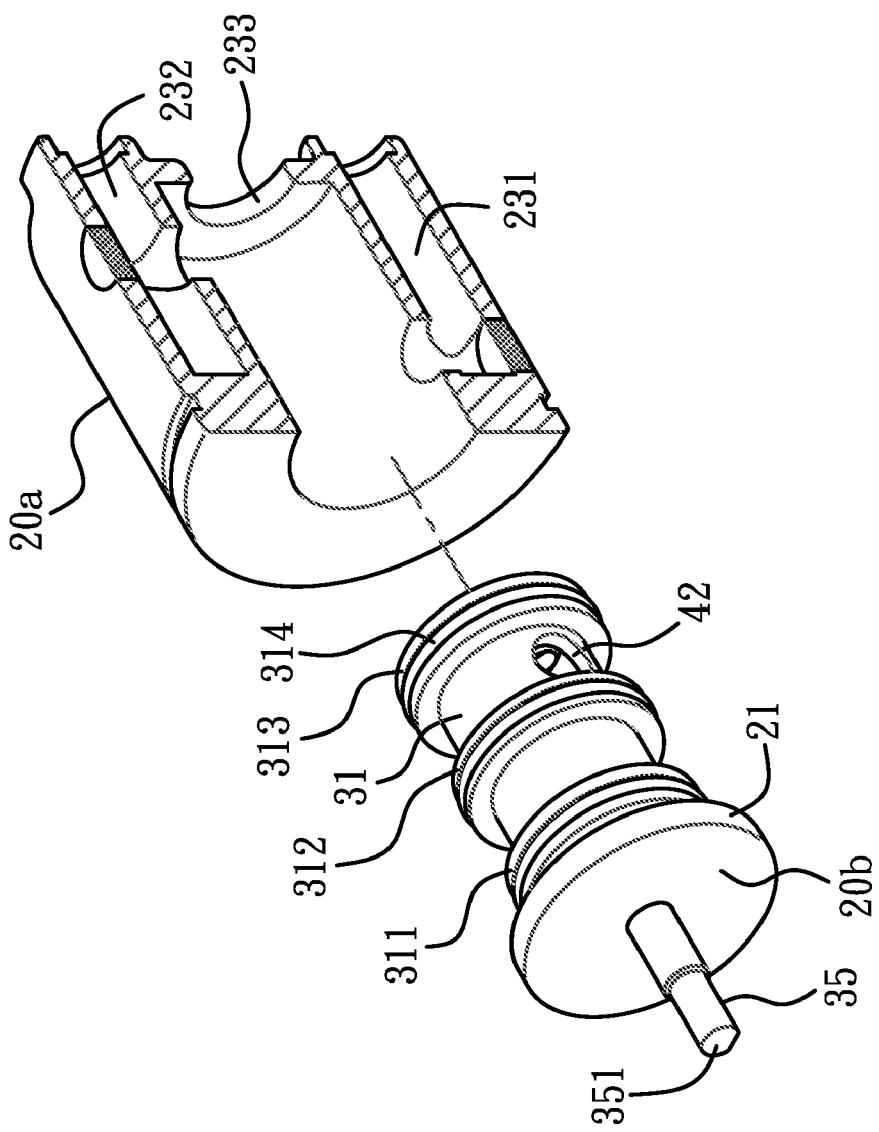
FIG. 14 is a perspective view showing the cross section of the exploded components of a part of the temperature controlling valve according to the second embodiment of the present invention.
Figure 15:
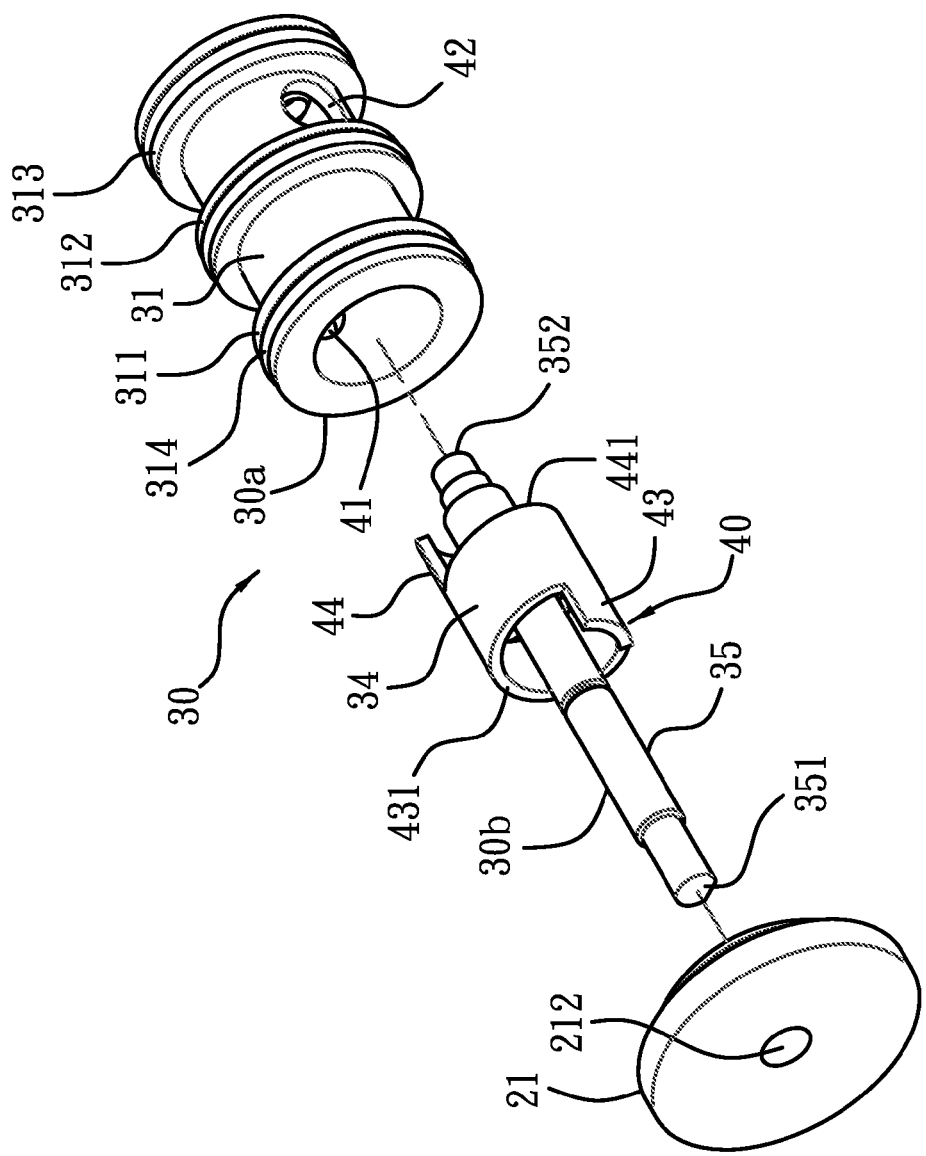
FIG. 15 is a perspective view showing the exploded components of a temperature control set according to the second embodiment of the present invention.
Figure 16:
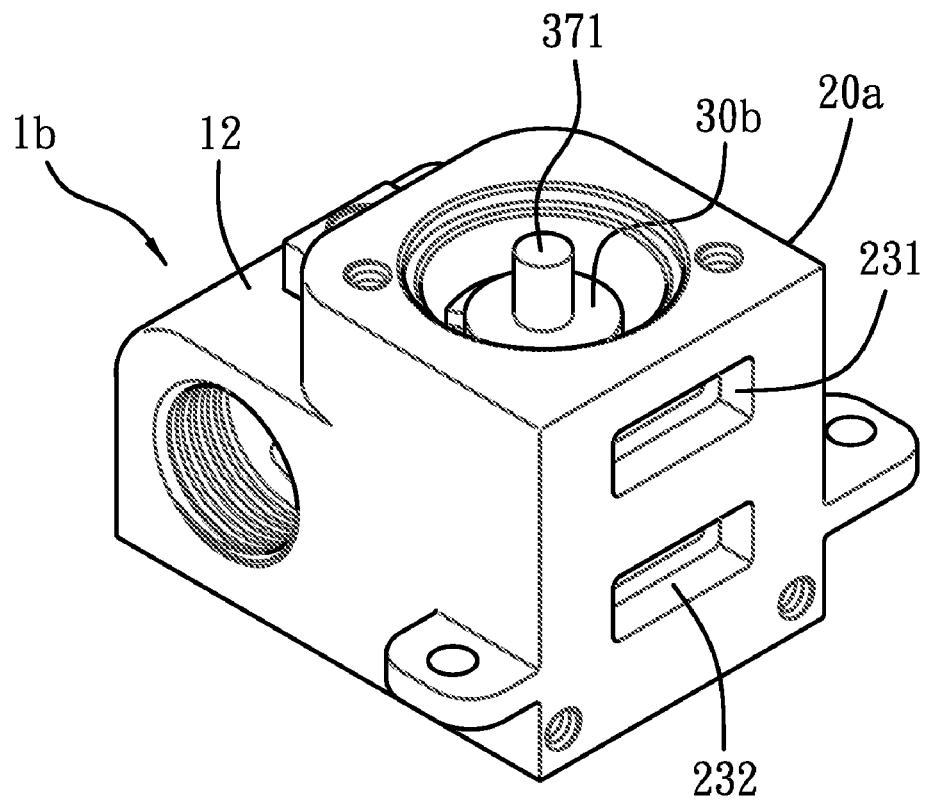
FIG. 16 is a perspective view showing the assembly of a part of a temperature controlling valve according to a third embodiment of the present invention.

As illustrated in FIGS. 10-12, a temperature controlling valve 1a according to a second embodiment of the present invention is installed to another type of outlet valve seat 2, and a different structure of the temperature controlling valve 1a from that of the temperature controlling valve 1 of the first embodiment includes:

a. The temperature controlling valve 1 of the first embodiment is installed vertically, therefore the centrally axial segment 35 of the valve core 30b extends vertically, and the driving motor 50 is actuated to rotate along a vertically axial line. But, the temperature controlling valve 1a of the second embodiment is installed horizontally, therefore the centrally axial segment 35 of the valve core 30b extends horizontally, and the driving motor 50 is actuated to rotate along a horizontally axial line.

b. The driving motor 50 of the first embodiment is connected with the first end portion 351 of the centrally axial segment 35 of the valve core 30b to be actuated to rotate by using the coupling member 511 and the retaining members 512. But the driving motor 50 of the second embodiment is coupled with a belt wheel 514 of the first end portion 351 of the valve core 30b to be actuated to rotate.

c. The temperature controlling valve 1 of the first embodiment connects with the base 20, the pressure balance valve 11, and the outlet piping 12. However, the temperature controlling valve 1a of the second embodiment further comprises a cover 60 covered thereon to receive a base 20, accordingly the base 20 is an independent component to be replaced removably, and the cover 60 includes a cylinder member 61 and a lid 62 screwed to one side of the cylinder member 61, and the lid 62 includes an abutting tab 621 formed on an inner side thereof to limit the upper housing 20b, so that the upper housing 20b is movably engaged to the body 20a without using the screw bolts 211. Due to the upper housing 20b engages with the body 20a tightly, the first end rim 32 of the first embodiment is not necessary in the second embodiment but is replaced by the first end wall 21. As shown in FIGS. 11, 13, the first peripheral rim 31 includes an orifice attached on one end thereof opposite to the first end wall 21.

d. The first passage 233 of the first embodiment communicates with the peripheral wall 23 of the body 20a proximate to the second end wall 22; and a first passage 233 of the second embodiment communicates with a central portion of the second end wall 22 of the body 20a as illustrated in FIGS. 11 and 13.

e. The second peripheral rim 34, the centrally axial segment 35, and the isolating rim 36 of the first embodiment are integrally formed, but the second peripheral rim 34 and the isolating rim 36 of the second embodiment are worked independently, the centrally axial segment 35 of the second embodiment is formed independently from the second peripheral rim 34 and the isolating rim 36, and the second peripheral rim 34, the centrally axial segment 35, and the isolating rim 36 of the second embodiment are assembled together easily by using the stepped rim and the limiting element. In addition, the second end rim 33 of the casing 30a of the first embodiment is comprised of a disc component, and the fixing segment 331 is a closed component. A second end rim 33 of the second embodiment is integrally formed with the casing 30a, and includes an open fixing segment 331 disposed thereon so as to insert the second end portion 352 of the centrally axial segment 35 to be retained.

With reference to FIGS. 16-20, a different structure of a temperature controlling valve 1b of a third embodiment from that of the first embodiment includes:

a. The first pore 41 and the second pore 42 of the water supplying means 40 of the first embodiment are fixed to the first peripheral rim 31 of the casing 30a of the temperature control set 30, and the first shield 43 and the second shield 44 are mounted to the top and the bottom ends of the second peripheral rim 34 of the valve core 31. A first pore 41 and a second pore 42 of the second embodiment are fixed to the second peripheral rim 34 of the valve core 30b, the first shield 43 and the second shield 44 of the second embodiment are mounted to the first peripheral rim 31 of the casing 30a.

b. The first peripheral rim 31 of the casing 30a of the second embodiment includes the first shield 43 and the second shield 44 integrally extending from the top and the bottom ends thereof without the first and the second end rims 32, 33 and the first and the third projected walls 311, 313 of the first embodiment. Moreover, the first peripheral rim 31 of the casing 30a includes an engaging periphery 315 disposed thereon adjacent to the second projected wall 312, and the receiving groove 201 of the base 20 includes a stepped periphery 238 formed therein to retain the engaging periphery 315.

The valve core 30b includes a first pore 41 and a second pore 42 disposed on two symmetrical positions of the second peripheral rim 34 opposite to the first shield 43 and the second shield 44 of the casing 30a, and the second peripheral rim 34 includes a third end rim 37 mounted on a top end thereof and a fourth end rim 38 secured on a bottom end thereof, the fourth end rim 38 includes a plurality of third bores 381 arranged thereon to communicate with the first passage 233.

The third end rim 37 includes a connecting axial section 371 integrally extending from a center of a top end thereof to be driven by the driving motor 50 and to replace the first end portion 351 of the centrally axial segment 35 so that the first end portion 351 connects with a bottom end of the third end rim 37 without extending outward, and a bottom end of the first end portion 351 couples with the fourth end rim 38, and the fourth end rim 38 includes a second end portion 352 extending from a center of the bottom surface thereof. The second peripheral rim 34, the third end rim 37, and the connecting axial section 371 of the third embodiment are integrally formed, and the centrally axial segment 35, the isolating rim 36, and the fourth end rim 38 of the third embodiment are integrally formed. Furthermore, the second peripheral rim 34 includes a fourth seal ring 341 retained thereon to engages with the first hole 237 of the body 20a.

c. A first external chamber 301 of the third embodiment includes the receiving groove 201, the first peripheral rim 31, the centrally axial segment 35, the second peripheral rim 34, and the third end rim 37 defined therein; the second external chamber 302 of the third embodiment includes the receiving groove 201, the first seal ring 341 of the first peripheral rim 31, and the fourth seal ring 341 of the second peripheral rim 34 defined therein. The first internal chamber 303 includes the second peripheral rim 34, the centrally axial segment 35, the isolating rim 36, and the third end rim 37 defined therein; the second internal chamber 304 includes the second peripheral rim 34, the centrally axial segment 35, and the fourth end rim 38 defined therein.

Figure 17:
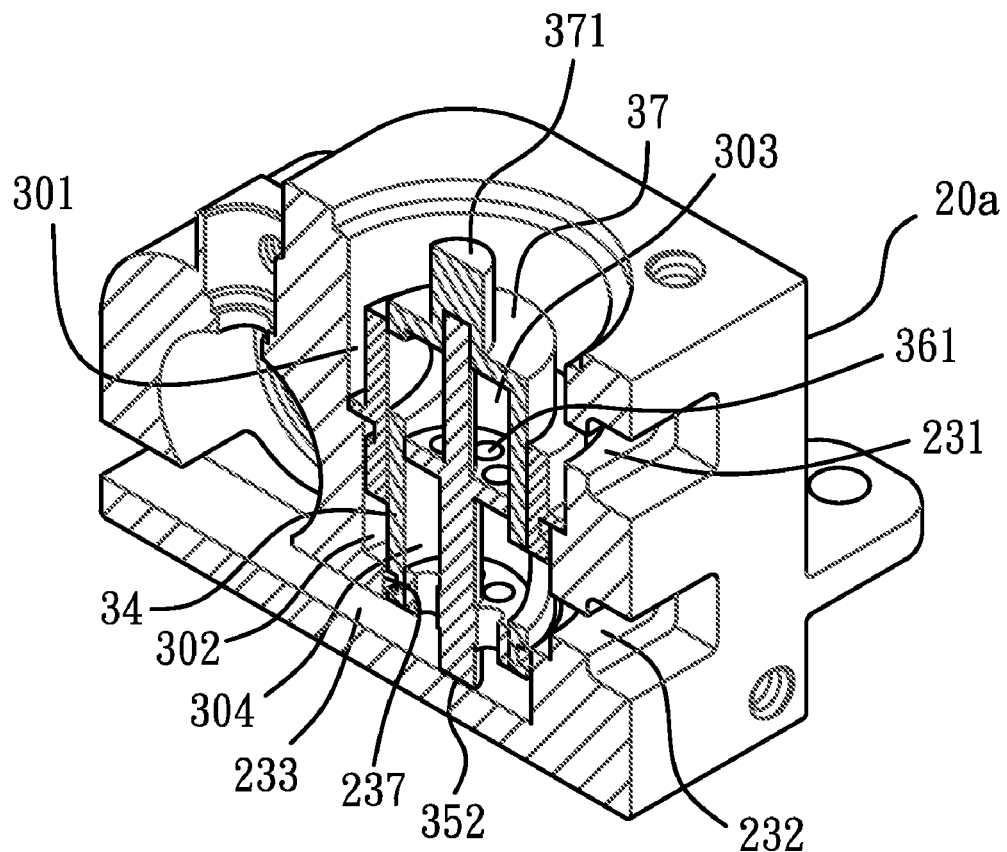
FIG. 17 is a perspective view showing the cross section of a part of the temperature controlling valve according to the third embodiment of the present invention.
Figure 18:
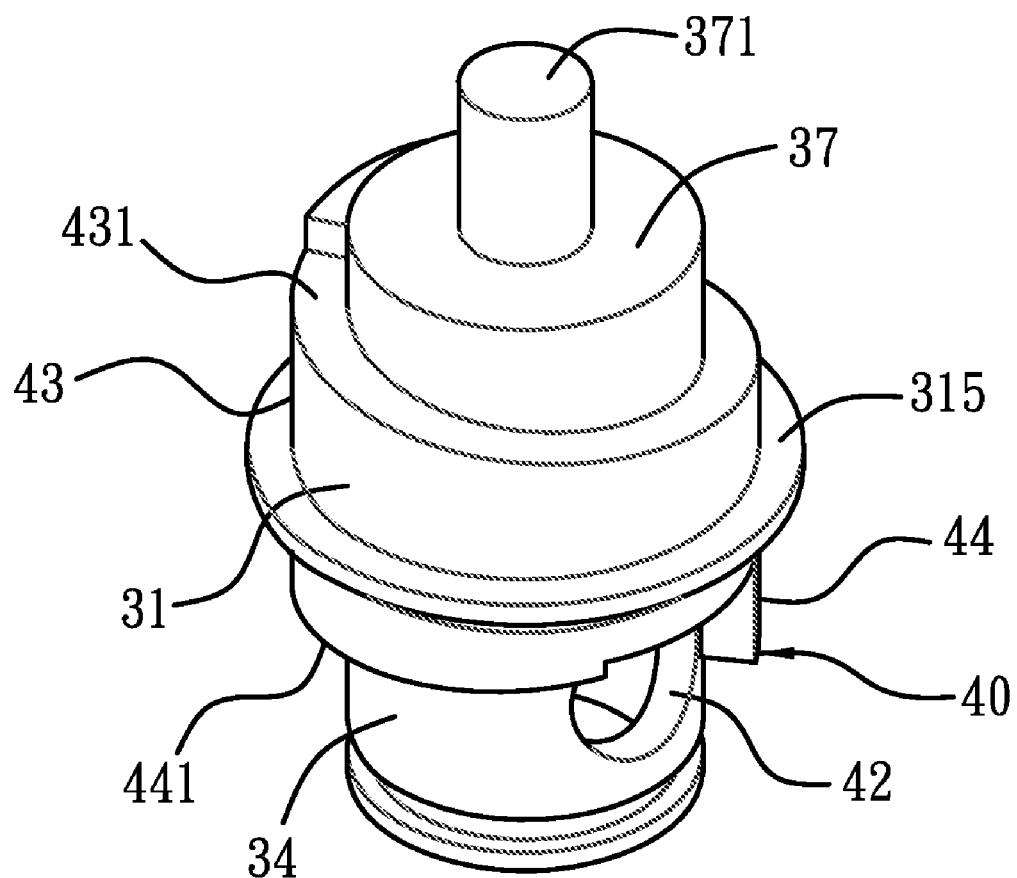
FIG. 18 is a perspective view showing the assembly of a temperature control set of the temperature controlling valve according to the third embodiment of the present invention.
Figure 19:
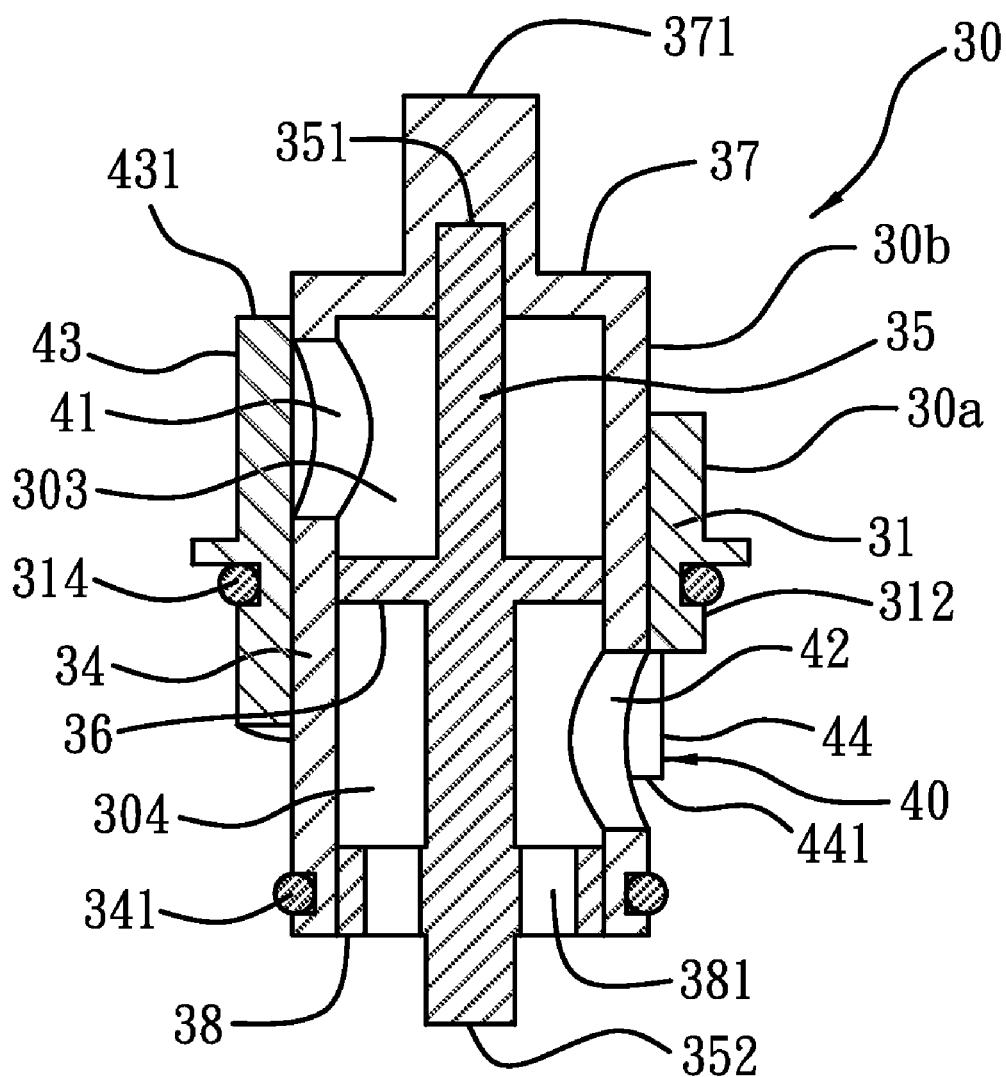
FIG. 19 is a cross sectional view showing the assembly of the temperature control set of the temperature controlling valve according to the third embodiment of the present invention.
Figure 20:
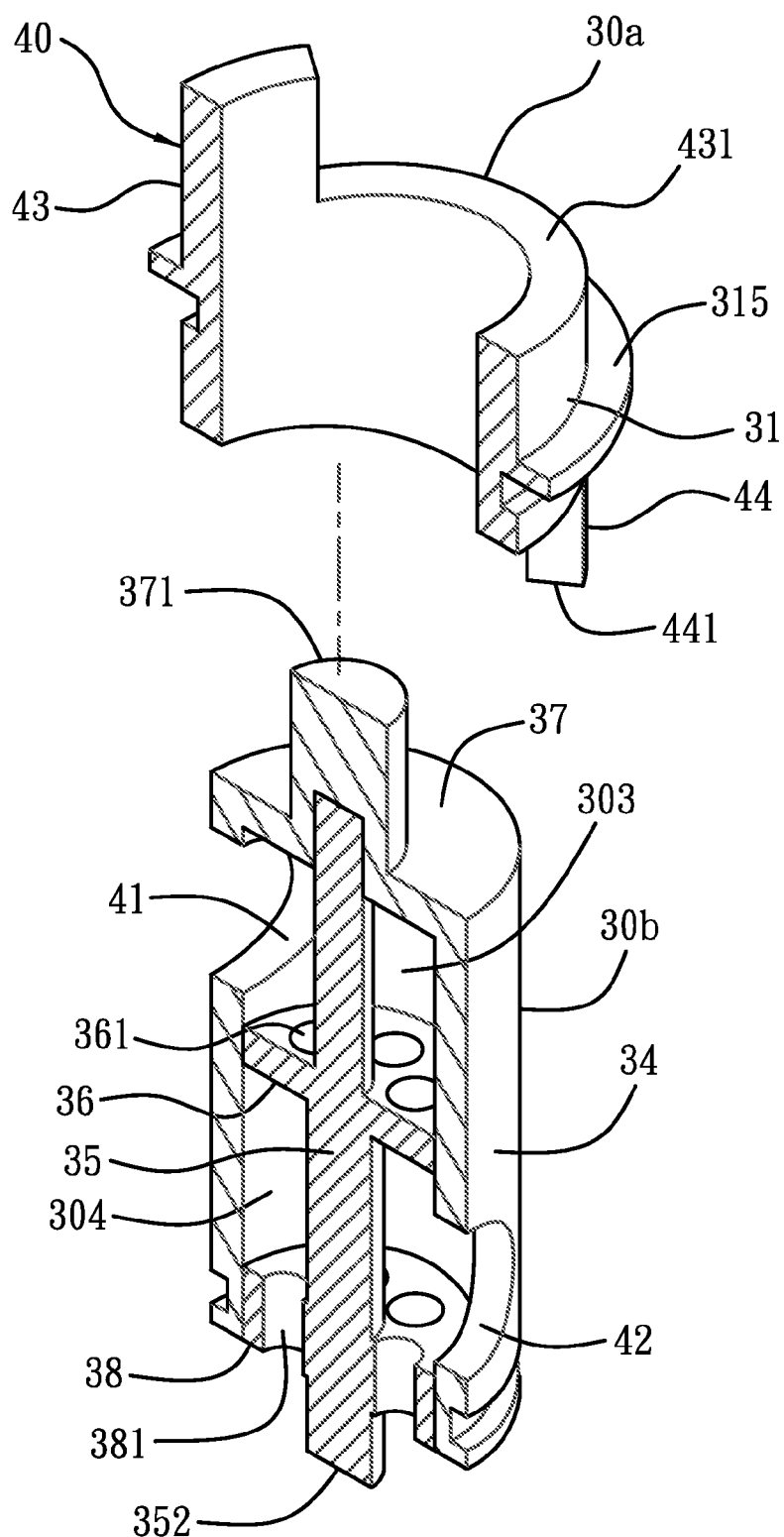
FIG. 20 is a perspective view showing the exploded components of the temperature control set of the temperature controlling valve according to the third embodiment of the present invention.
Figure 21:
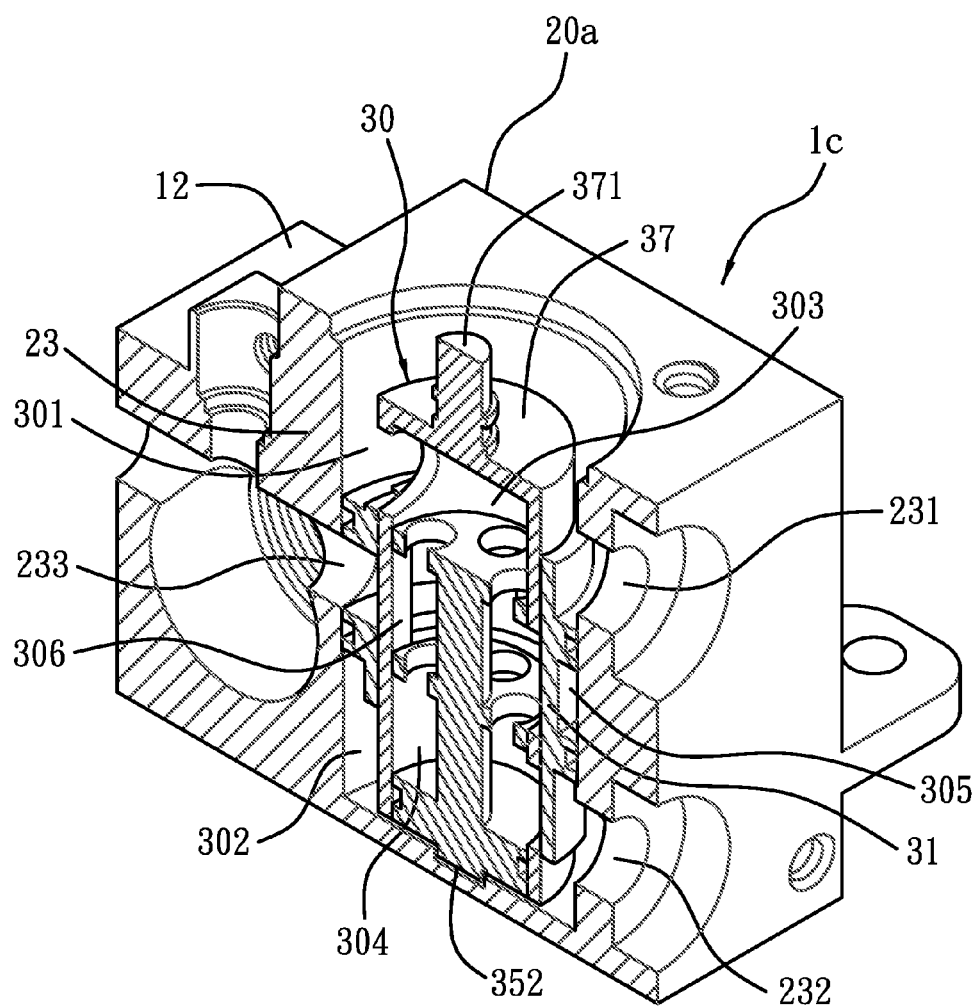
FIG. 21 is a perspective view showing the cross section of a part of a temperature controlling valve according to a fourth embodiment of the present invention.
Figure 22:
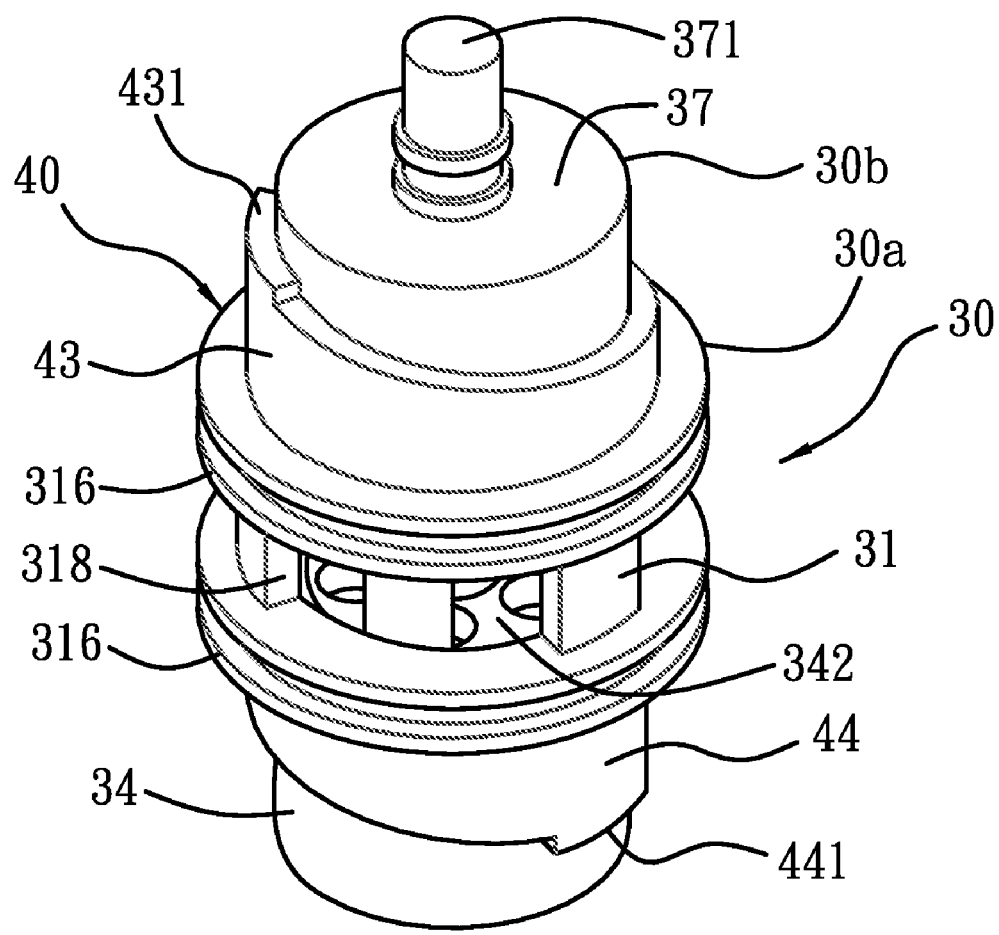
FIG. 22 is a perspective view showing the assembly of a temperature control set of the temperature controlling valve according to the fourth embodiment of the present invention.
Figure 23:
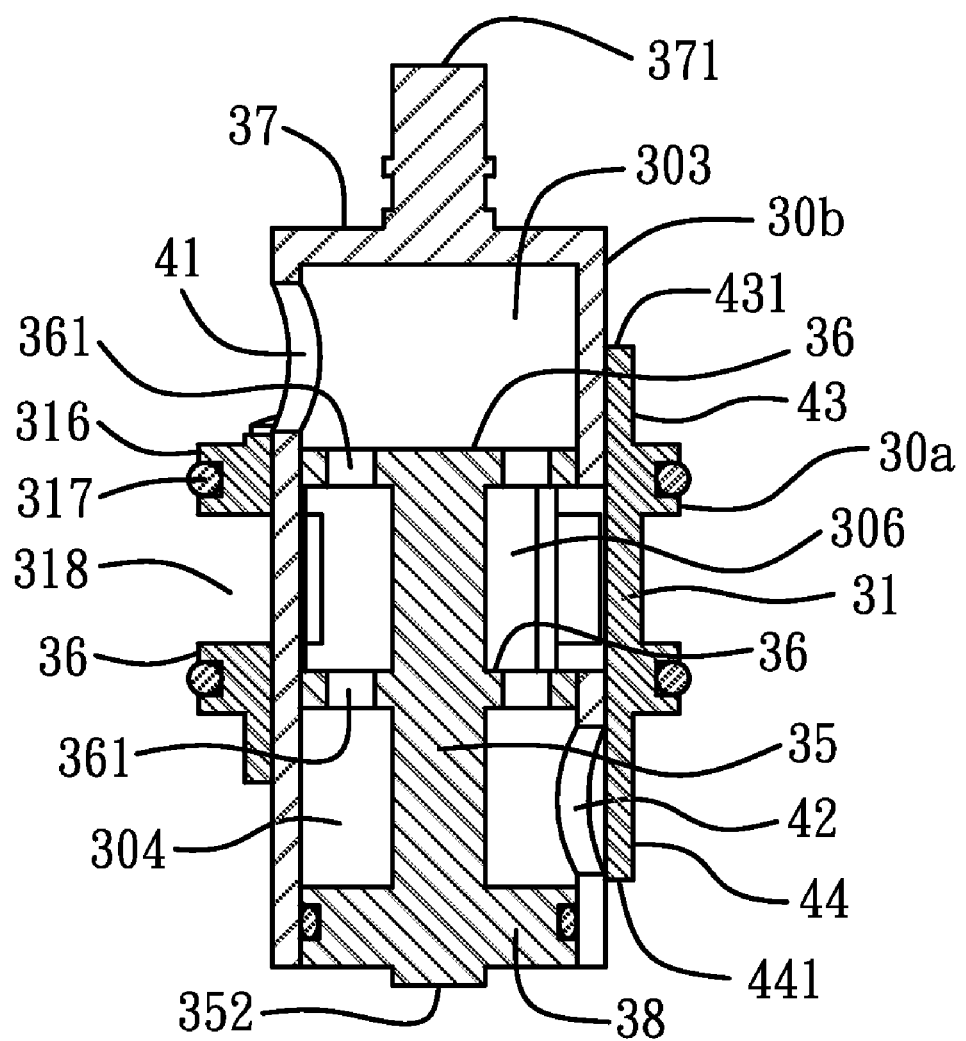
FIG. 23 is a cross sectional view showing the assembly of the temperature control set of the temperature controlling valve according to the fourth embodiment of the present invention.
Figure 24:
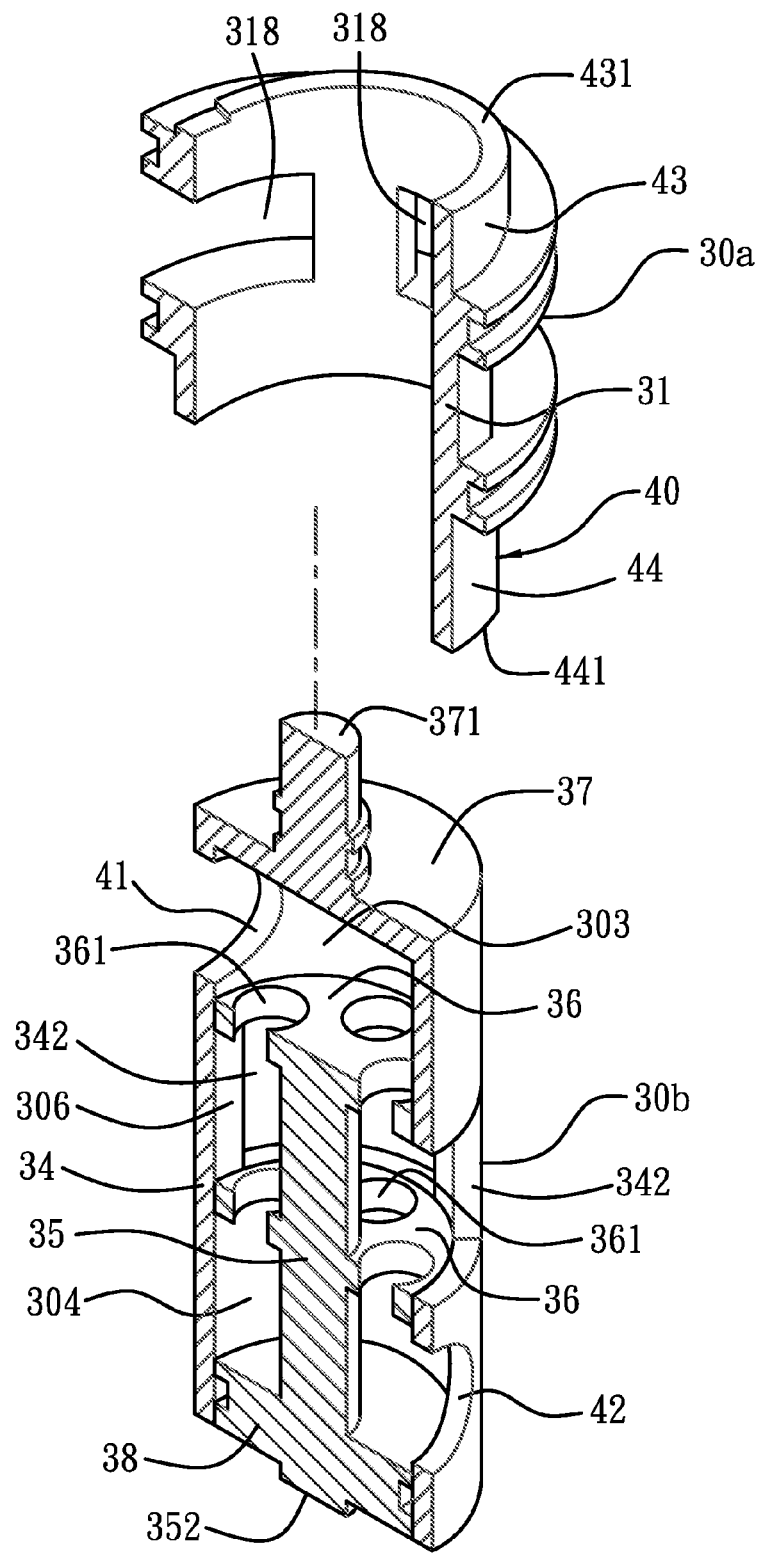
FIG. 24 is a perspective view showing the exploded components of the temperature control set of the temperature controlling valve according to the fourth embodiment of the present invention.

Referring to FIGS. 17 and 19, the hot and the cold waters flow into the first and the second external chambers 301, 302 form the first and the second tunnels 231, 232 respectively, and then flow into the first and the second internal chambers 303, 304 through the first and the second pores 41, 42 individually, wherein the hot water in the first internal chamber 303 further flows to the second internal chamber 304 to mix with the cold water via the second bores 361, and the driving motor 50 is applied to actuate the valve core 30b to rotate for adjusting a mixed rate of the cold and the hot waters, thus adjusting the temperature of the mixed cold and the hot waters.

As shown in FIGS. 21-24, a different structure of a temperature controlling valve 1b of a fourth embodiment from that of the first embodiment includes:

a. The first passages 233 of the first, the second, and the third embodiment are connected to the peripheral wall 23 of the body 20a adjacent to the second end wall 22. A first passages 233 of the fourth embodiment is coupled to a central section of the peripheral wall 23 of the body 20a between the first and the second external chambers 301, 302, but is separated apart from the first and the second external chambers 301, 302.

b. Besides, between the first and the second external chambers 301, 302 of the fourth embodiment is defined a third external chamber 305 to receive mixed cold and hot waters, and between the first and the second internal chambers 303, 304 is defined a third internal chamber 306 to receive the mixed cold and hot water so that the hot water from the first internal chamber 303 and the cold water from the second internal chamber 304 flow into the third internal chamber 306 to be mixed together, and then flow out of the first passage 233 through the third external chamber 305. The first peripheral rim 31 of the casing 30a of the fourth embodiment includes two annular projections 316 disposed on an outer surface thereof to space a determined axial distance apart from each other, and the annular projection 316 includes a fifth seal ring 317 mounted thereon to engage with the peripheral wall 23 of the body 20a so that between the first peripheral rim 31 of the casing 30a and the receiving groove 201 of the base 20 is defined the third external chamber 305 by ways of the fifth seal rings 317 of the annular projections 316 to space the first and the second external chambers 301, 302 apart from each other.

The centrally axial segment 35 of the valve core 30b includes two isolating rims 36 radially extending from an outer surface thereof and separating a predetermined axial distance apart so as to define the third internal chamber 306 between the isolating rims 36. The first peripheral rim 31 of the casing 30a includes a plurality of first ventilations 318 arranged thereon relative to the third external chamber 305, and the second peripheral rim 34 of the valve core 30b includes a number of second ventilations 342 attached thereon relative to the third internal chamber 306, such that the third external chamber 305 and the third internal chamber 306 are communication with each other, and the hot water in the first internal chamber 303 and the cold water in the second internal chamber 304 flow into the third internal chamber 306 to be mixed together via the second bores 361 of the isolating rim 36, and then the mixed water in the third internal chamber 306 flows into the third external chamber 305 through the second ventilations 342 and the first ventilations 318, and then flows into the first passage 233. It is to be noted that the fourth end rim 38 of the fourth embodiment is closed without providing the third bores 381 of the third embodiment thereon.

Moreover, the valve core 30b, the centrally axial segment 35, the isolating rims 36, and the fourth end rim 38 are an integral component, and the first end portion 351 of the centrally axial segment 35 is in connected with the isolating rim 36 without coupling with the third end rim 37, the second end portion 352 axially retains with the second end wall 22 of the body 20a.

While we have shown and described various embodiments in accordance with the present invention, it is clear to those skilled in the art that further embodiments may be made without departing from the scope of the present invention.

What is claimed is:

1. A temperature controlling valve comprising a base including a first end wall, a second end wall, and a peripheral wall; among the first end wall, the second end wall, and the peripheral wall being defined a receiving groove, the peripheral wall passing through a first tunnel to flow hot water and a second tunnel to flow cold water at two different axial positions respectively and to communicate with the receiving groove, the peripheral wall including a first passage arranged on one side thereof proximate to the second end wall so as to communicate with the receiving groove;

a temperature control set installed in the receiving groove of the base, and between the temperature control set and the receiving groove being defined a first external chamber to receive the hot water and to communicate with the first tunnel, and a second external chamber to receive the cold water and to communicate with the second tunnel; the temperature control set including a first internal chamber to receive the hot water and a second internal chamber to receive the cold water, both of which are in communication with the first passage; the temperature control set further including a casing, and a valve core movably contacting with the casing to be driven to rotate at an original position;

a water supplying means used in the casing and the valve core of the temperature control seat, and including a first pore to flow the hot water and to communicate with the first external chamber and the first internal chamber, including a second pore to flow the cold water and to communicate with the second external chamber and the second internal chamber, including a first shield to close the first pore, and including a second shield to close the second pore; a part of the first pore where is not closed by the first shield being defined a cross sectional area to flow the hot water, and a part of the second pore where is not closed by the second shield being defined a cross sectional area to flow the hot water; a cross sectional area of the first pore to flow the cold water and the cross sectional area of the second pore to flow the hot water are relatively increased or decreased with the rotation of the valve core in the casing.

2. The temperature controlling valve as claimed in claim 1, wherein the first external chamber and the second external chamber are defined by a first peripheral rim of the casing and a peripheral wall of the base; one parts of the first internal chamber and the second internal chamber are defined by the first peripheral rim of the casing and the valve core; the first pore and the second pore of the water supplying means are fixed at two different axial positions of the peripheral rim of the casing individually, and the first and the second shields are arranged to a top and a bottom sides of a second peripheral rim of the valve core respectively; the first and the second shields contact with the first peripheral rim of the casing, and axial widths of the first and the second shields become increased or decreased with changing circumferential position.

3. The temperature controlling valve as claimed in claim 2, wherein the peripheral wall of the base communicates with the first passage, the first peripheral of the casing rim includes a first end rim integrally connected onto a top end thereof, and includes a second end rim arranged on a bottom end thereof; the first end rim is opposite to the first end wall of the base to define a part of the first internal chamber, and includes an aperture disposed thereon; the second end rim is opposite to the second end wall of the base to define a part of the second internal chamber, and includes a fixing segment disposed thereon and a plurality of first bores arranged around the fixing segment; the valve core includes a centrally axial segment extending along the second peripheral rim, and an isolating rim integrally connecting with the second peripheral rim and the centrally axial segment; the centrally axial segment includes a first end portion and a second end portion; the first end portion extends outward through the aperture of the casing and first end wall of the base to be driven to rotate; the second end portion axially retains with the fixing segment of the casing; the isolating rim is used to separate the first internal chamber apart from the second internal chamber, and includes a plurality of first bores arranged thereon to communicate the first internal chamber with the second internal chamber, the second internal chamber communicates with the first passage by using the first bores of the second end rim of the casing.

4. The temperature controlling valve as claimed in claim 2, wherein the first peripheral rim includes a first projected wall, a second projected wall, and a third projected wall radially extending therefrom respectively, and the first, the second, and the third projected walls individually include a first seal ring retained thereon to engage with the peripheral wall of the base so that between the first seal of the first projected wall and the first seal ring of the second projected wall is defined a first external chamber, and between the first seal ring of the second projected wall and the first seal ring of the third projected wall is defined the second external chamber.

5. The temperature controlling valve as claimed in claim 2, wherein the second end wall of the base includes the first passage communicating thereon; the first peripheral rim of the casing includes an orifice attached on one end thereof opposite to the first end wall of the base so that the first end wall of the base defines a part of the first internal chamber, and another end of the peripheral wall connects with a second end wall of the base to define a part of the second internal chamber; the second end rim of the casing includes the fixing segment disposed thereon and a plurality of first bores arranged around the fixing segment; the valve core includes a centrally axial segment extending along the first peripheral rim, and an isolating rim connecting between the first peripheral rim and the centrally axial segment; the centrally axial segment includes a first end portion and a second end portion; the first end portion extends out of the first end wall of the base to be driven to rotate; the second end portion axially retains with the fixing segment of the casing; the isolating rim is used to separate the first internal chamber apart from the second internal chamber, and includes a plurality of first bores arranged thereon to communicate the first internal chamber with the second internal chamber, the second internal chamber communicates with the first passage by using the first bores of the second end rim of the casing.

6. The temperature controlling valve as claimed in claim 1, wherein the base further includes a body and an upper housing, the body includes the peripheral wall and the second end wall of the base formed therein, and the upper housing is fixed to an opening attached on a top end of the body so as to form the first end wall of the base, and the valve core extends out of the upper housing to be driven to rotate.

7. The temperature controlling valve as claimed in claim 6, wherein the upper housing includes a motor holder to receive the driving motor so that a part of the valve core extending out of the upper housing is driven by the driving motor.

8. The temperature controlling valve as claimed in claim 1 further comprising a cover, and the cover includes a cylinder member and a lid screwed to one side of the cylinder member; the base is received in the cover; and the base includes a body and a upper housing; the body includes the peripheral wall and the second end wall of the base formed therein, and the upper housing includes the second end wall of the base defined therein, the upper housing is movably engaged to the body and is retained by the lid; the valve core extends out of the upper housing and the lid to be driven to rotate.

9. The temperature controlling valve as claimed in claim 1 further comprising a driving motor to drive the valve core of the temperature control set.

10. The temperature controlling valve as claimed in claim 1, wherein the first external chamber and the second external chamber are defined by the receiving groove of the base and the first peripheral rim of the casing, and the valve core; the first internal chamber and the second internal chamber are defined in the valve core; the first pore and the second pore of the water supplying means are fixed at two different axial positions of the second peripheral rim of the valve core individually, and the first shield extends from a top end of the first peripheral rim of the casing, the second shield extends along a bottom end of the first peripheral rim of the casing; the first and the second shields contact with the second peripheral rim of the valve core, and axial widths of the first and the second shields become increased or decreased with changing circumferential position.

11. The temperature controlling valve as claimed in claim 10, wherein the peripheral wall of the base communicates with the first passage, the second peripheral rim of the valve core includes a third end rim, a fourth end rim, and an isolating rim arranged on two ends and a middle portion thereof respectively; the third end rim is opposite to the first end wall of the base and used to define the first internal chamber with the isolating rim and the second peripheral rim of the valve core, and the first pore is fixed on the second peripheral rim of the valve core relative to the first internal chamber; the fourth end rim is opposite to a second end wall of the base to define the second internal chamber with the isolating rim and the second peripheral rim of the valve core, and the second pore is disposed on the second peripheral rim relative to the second internal chamber, and includes a plurality of third bores arranged thereon to communicate with the first passage which is communication with the second internal chamber and the base; the isolating rim includes a plurality of second bores arranged thereon to communicate the first internal chamber with the second internal chamber.

12. The temperature controlling valve as claimed in claim 11, wherein the valve core further includes a centrally axial segment and a connecting axial section; the isolating rim and the fourth end rim radially extend from the centrally axial segment; the centrally axial segment includes a first end portion and a second end portion, and the first end portion connects with the first end rim of the valve core, and the second end portion axially retains with the second end wall of the base; the connecting axial section integrally extends from a center of a top end of the third end rim to extend out of the first end wall of the base to be driven by the driving motor.

13. The temperature controlling valve as claimed in claim 11, wherein the first peripheral rim of the casing includes a first seal ring retained thereof to engage with the peripheral wall of the base, and the first peripheral rim of the casing includes an engaging periphery disposed thereon adjacent to the first seal ring to retain with a stepped periphery formed on the peripheral wall of the base; the peripheral wall of the base adjacent to second end wall includes a first hole disposed thereon to communicate with the first passage; the second peripheral rim of the valve core includes a fourth seal ring retained thereon to engages with the first hole of the base; the first external chamber is located between the first end wall of the base and the first seal ring of the casing; the second external chamber is located at the first seal ring of the casing and the fourth seal ring of the valve core.

14. The temperature controlling valve as claimed in claim 10, wherein the peripheral wall of the base includes the first passage coupled to a central section thereof; the first peripheral rim of the casing includes two fifth seal rings mounted thereon to engage with the peripheral wall of the base so that between the fifth seal rings of the first peripheral rim of the casing and the peripheral wall of the base is defined a third external chamber to communicate with the first passage, and the third external chamber is located between the first external chamber and the second external chamber, the first peripheral rim of the casing includes a plurality of first ventilations arranged thereon relative to the third external chamber; and the second peripheral rim of the valve core includes a third end rim mounted on a top end thereof, a fourth end rim secured on a bottom end thereof, and two isolating rims arranged thereon; the third end rim is relative to the first end wall of the base and used to define the first internal chamber with the second peripheral rim and the isolating rim, and the first pore is disposed on the second peripheral rim relative to the first internal chamber; the fourth end rim is opposite to the second end wall of the base and used to define the second internal chamber with the isolating rim and the second peripheral rim, and a second pore is disposed on the second peripheral rim opposite to the second internal chamber; between the isolating rims and the second peripheral rim is defined a third internal chamber, and the isolating rim includes a plurality of second bores arranged thereon to communicate the first internal chamber with the second internal chamber; the second peripheral rim of the valve core includes a number of second ventilations attached thereon relative to the third internal chamber so as to communicate with the first ventilations of the casing so that the third internal chamber communicates with the third external chamber.

15. The temperature controlling valve as claimed in claim 14, wherein the valve core further includes a centrally axial segment and a connecting axial section; the isolating rims and the fourth end rim radially extends from the centrally axial segment; and the centrally axial segment includes a first end portion and a second end portion, the first end portion connects with a bottom end of the third end rim, and a bottom end of the first end portion couples with the fourth end rim, the fourth end rim includes the second end portion extending from a center of the bottom surface thereof; the connecting axial section integrally extending from a center of a top end of the third end rim to be driven by the driving motor.

16. The temperature controlling valve as claimed in claim 14, wherein the first peripheral rim of the casing includes an engaging periphery disposed thereon, and the peripheral wall of the base includes a stepped periphery formed therein to retain the engaging periphery.

* * * * *